(12) United States Patent
Shibamori

(10) Patent No.: US 12,069,221 B2
(45) Date of Patent: Aug. 20, 2024

(54) INFORMATION PROCESSING APPARATUS, CONTROL METHOD, AND STORAGE MEDIUM COMPRISING IDENTIFICATION OF A SPECIAL COLOR REGION IN AN IMAGE TO BE PRINTED, DETECTING A COLOR REGION SURROUNDING THE PIXELS OF THE SPECIAL COLOR REGION AND DISPLAYING A PREDETERMINED PRESENTATION BASED ON THE DETECTION OF THE COLOR REGION SURROUNDING THE PIXELS

(71) Applicant: CANON KABUSHIKI KAISHA, Tokyo (JP)

(72) Inventor: Tomoki Shibamori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/319,423

(22) Filed: May 17, 2023

(65) Prior Publication Data

US 2023/0388436 A1 Nov. 30, 2023

(30) Foreign Application Priority Data

May 30, 2022 (JP) .................................. 2022-087746

(51) Int. Cl.
*H04N 1/54* (2006.01)
*G06V 10/56* (2022.01)
*G06V 10/75* (2022.01)
*H04N 1/60* (2006.01)

(52) U.S. Cl.
CPC ............... *H04N 1/54* (2013.01); *G06V 10/56* (2022.01); *G06V 10/751* (2022.01); *H04N 1/60* (2013.01)

(58) Field of Classification Search
CPC ............ H04N 1/54; H04N 1/60; G06V 10/56; G06V 10/751
USPC ....... 358/1.11–1.18, 500, 504, 518, 538, 540
See application file for complete search history.

(56) References Cited

U.S. PATENT DOCUMENTS

| | | | |
|---|---|---|---|
| 2014/0085648 A1* | 3/2014 | Kawamura ........ | H04N 1/40062 358/1.9 |
| 2017/0085753 A1* | 3/2017 | Takahira .................. | H04N 1/54 |
| 2022/0174184 A1* | 6/2022 | Hayashi ............... | H04N 1/6011 |

FOREIGN PATENT DOCUMENTS

| | | | | |
|---|---|---|---|---|
| JP | 2003198864 A | * | 7/2003 | ........... H04N 1/6019 |
| JP | 2016-103695 | | 6/2016 | |

* cited by examiner

*Primary Examiner* — Chad Dickerson
(74) *Attorney, Agent, or Firm* — Venable LLP

(57) ABSTRACT

Provided is an information processing apparatus capable of inhibiting a spot color printing result from turning out not as intended by a user, as well as a control method and a storage medium. To this end, a pixel region for which spot color printing is specified is identified in print data, and it is determined whether pixels surrounding the identified pixel region include a pixel which is in a color approximating to the spot color and whose color difference from the spot color equals or falls below a predetermined value.

19 Claims, 21 Drawing Sheets

500

```
PRINT SETTINGS

501 — NUMBER OF COPIES: [ 1 ⇕ ]
    502 — SHEET SIZE:     [ A2              ⇕ ]
    503 — SHEET TYPE:     [ COATED PAPER    ⇕ ]
    504 — PRINT QUALITY:  [ NORMAL          ⇕ ]
    ─────────────────────────────────────────────
    505 — SHEET FEED METHOD: [ ROLL PAPER   ⇕ ]
    506 — ROLL PAPER WIDTH:  [ 24 in ROLL   ⇕ ]

SPOT COLOR PRINTING:  ☑ FLUORESCENCE PINK(RGB: 0xFF, 0x00, 0xFF) — 507
                          ☐ FLUORESCENCE ORANGE(RGB: 0xFF, 0x55, 0x00) — 508
                          ☑ PRINT PREVIEW — 509

[ CANCEL ]   [ OK ]
                                          510        511
```

| ATTRIBUTE TYPE | FLAG |
|---|---|
| NO ATTRIBUTE | 0 |
| TEXT | 1 |
| GRAPHICS | 2 |
| IMAGE | 3 |

FIG.14B

INFORMATION PROCESSING APPARATUS, CONTROL METHOD, AND STORAGE MEDIUM COMPRISING IDENTIFICATION OF A SPECIAL COLOR REGION IN AN IMAGE TO BE PRINTED, DETECTING A COLOR REGION SURROUNDING THE PIXELS OF THE SPECIAL COLOR REGION AND DISPLAYING A PREDETERMINED PRESENTATION BASED ON THE DETECTION OF THE COLOR REGION SURROUNDING THE PIXELS

BACKGROUND OF THE INVENTION

Field of the Invention

The present invention relates to an information processing apparatus capable of executing printing processing using a special color ink, as well as a control method and a storage medium.

Description of the Related Art

Japanese Patent Laid-Open No. 2016-103695 discloses a method for implementing spot color printing by having a user specify a replacement color to be replaced from a regular color, linking the specified replacement color to a special color, and replacing the replacement color with the special color linked thereto.

However, in a case where print target data includes an anti-aliased, rasterized object or an image object saved in a JPG format and containing compression noise, the method of Japanese Patent Laid-Open No. 2016-103695 cannot make the spot color specification evenly for the entire object. As a result, spot color printing cannot be performed as intended by the user.

SUMMARY OF THE INVENTION

To address the above problem, the present invention provides an information processing apparatus capable of inhibiting a spot color printing result from coming out not as intended by a user, as well as a control method and a storage medium.

To solve the above problem, a control method of the present invention is a control method for an information processing apparatus, the control method including: identifying a special color region in an image to be printed, the special color region being a region including a pixel having a pixel value corresponding to that of a region to be printed using at least a special color ink, wherein a color of the special color ink is other than a process color; detecting an approximate color region from surrounding pixels of the special color region identified in the identifying, the approximate color region being a region including a pixel with a pixel value which is different from the pixel value of the pixel of the special color region by a predetermined threshold or below and which corresponds to that of a region not to be printed using the special color ink; and displaying a predetermined presentation based on that the approximate color region has been detected in the detecting.

The present invention can provide an information processing apparatus capable of inhibiting a spot color printing result from coming out not as intended by a user, as well as a control method and a storage medium.

Further features of the present invention will become apparent from the following description of exemplary embodiments with reference to the attached drawings.

BRIEF DESCRIPTION OF THE DRAWINGS

FIG. 5 is a diagram showing an example of a print settings dialogue;
FIG. 14A is a diagram showing an example of how attribute information is stored;
FIG. 14B is a diagram showing an example of how attribute information is stored.

DESCRIPTION OF THE EMBODIMENTS

First Embodiment

A first embodiment of the present invention is described below with reference to some drawings.

Figure 1:
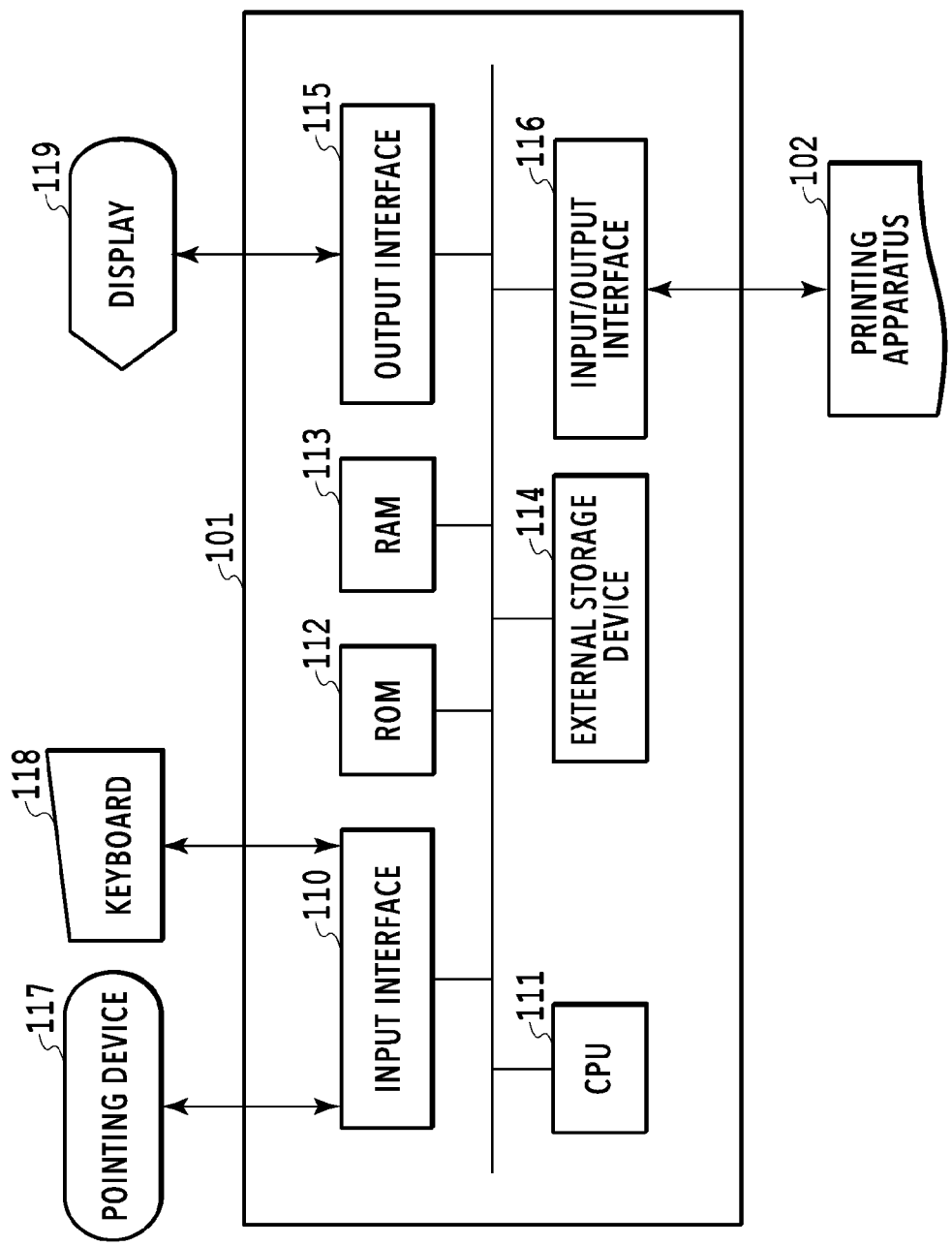
FIG. 1 is a block diagram showing the hardware configuration of a printing control system.

FIG. 1 is a block diagram showing the hardware configuration of a printing control system to which the present embodiment can be applied. A host computer 101 is an example of an information processing apparatus and includes an input interface 110, a CPU 111, a ROM 112, a RAM 113, an external storage device 114, an output interface 115, and an input/output interface 116. Also, input devices such as a keyboard 118 and a pointing device 117 are connected to the input interface 110, and a display device such as a display 119 is connected to the output interface 115.

An initialization program is stored in the ROM 112, and application programs, an operating system (OS), a driver for a printing apparatus (a printer driver), and other various pieces of data are stored in the external storage device 114. The RAM 113 is used as, e.g., work memory for execution of the various programs stored in the external storage device 114.

Note that in the present embodiment, a printing apparatus 102, which is a device, is connected to the host computer 101 via the input/output interface 116. Although configured separately here, the host computer 101 and the printing apparatus 102 may be configured as a single information processing apparatus.

In the present embodiment, the printing apparatus (image formation apparatus) 102 is described as being an ink jet printer that forms an image using ink as a color material. However, the present invention is not limited to this and can be applied to a printer that uses tone or the like as a color material.

Figure 2:
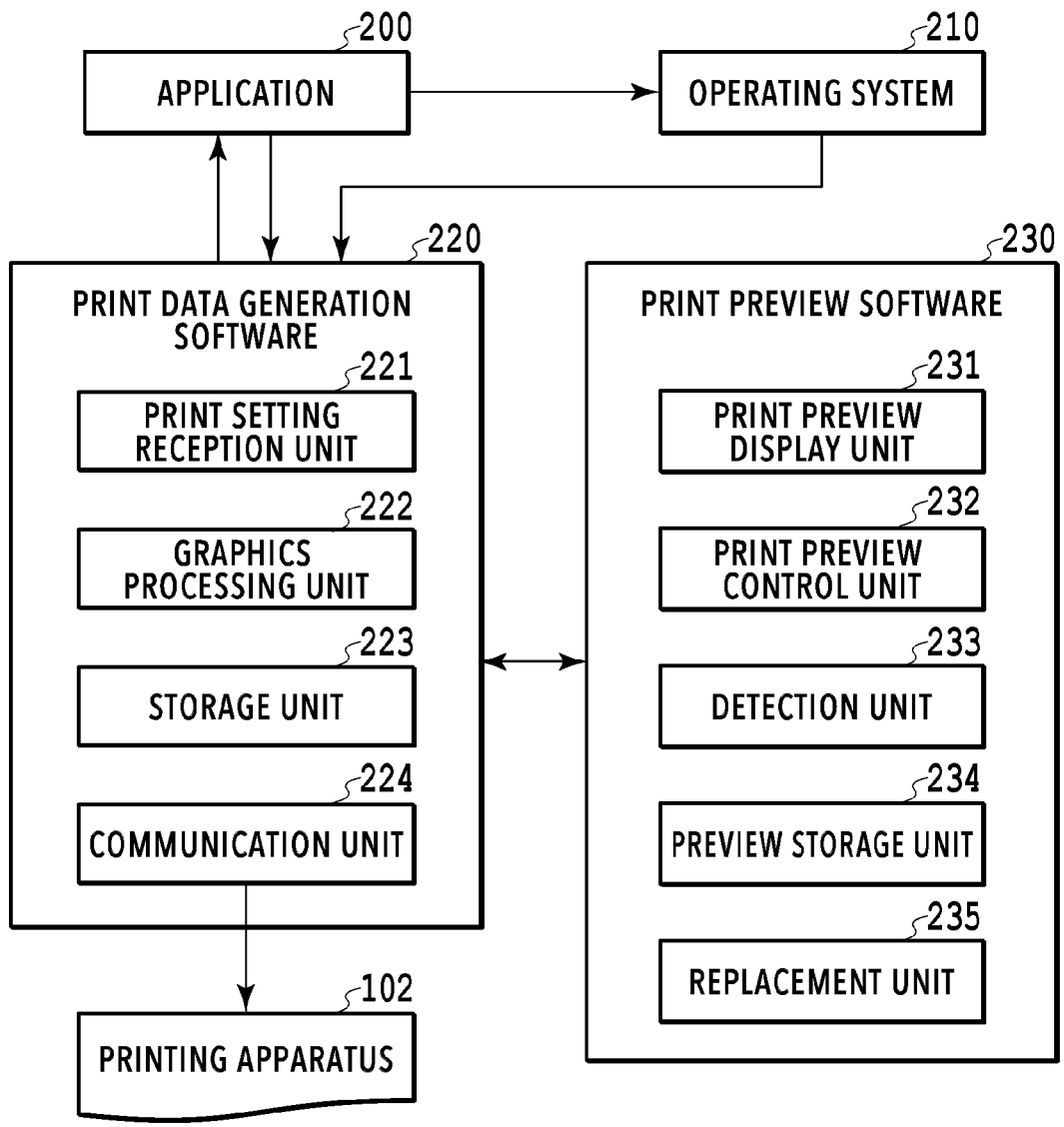
FIG. 2 is a block diagram showing the configuration of a printing system that performs spot color printing.

FIG. 2 is a block diagram showing the configuration of a printing system that performs spot color printing. In the present embodiment, the printing apparatus 102 is configured to be capable of spot color printing, which is printing using an ink of a spot color instead of regular ink (an ink of a spot color is in other words a special color ink and is also referred to as a "spot color ink" below). The "regular ink" is ink for performing process color printing and is ink of, e.g., cyan (C), magenta (M), yellow (Y), and black (K) which are the basic process colors. Note that a process color is a color represented by one color of CMYK or a combination of two or more colors of CMYK.

Also, in the present embodiment, a fluorescent pink ink and a fluorescent orange ink are used as the spot color ink. A spot color is a color not being a process color and is a color that cannot be represented only by one color of CMYK or by a combination of two or more colors of CMYK. However, the present invention is not limited to this mode. The number of spot color inks and the color of each spot color ink may be any number or color, and an ink of a non-fluorescent color may be used. Examples of the spot color ink include a violet ink, a green ink, an orange ink, a gold ink, and a silver ink. An ink of other metallic color may also be used. Further, an ink prepared by mixing of a spot color ink and other ink (for example, a regular ink) may also be handled as a spot color ink.

In printing that uses a spot color (hereinafter also referred to as spot color printing), a pixel with an RGB value corresponding to a spot color is printed in the spot color. Note that an RGB value corresponding to a spot color may also be used as an RGB value corresponding to a color represented only by regular ink (i.e., a regular color). In other words, in some cases, an RGB value which is the same as an RGB value corresponding to a spot color is set for a pixel corresponding to a color represented only by regular ink. In such a case, whether to use a special ink to print a pixel of that RGB value is controlled by whether printing data has added thereto information instructing spot color printing.

An application 200 is software for creating content to be printed and corresponds to, for example, an image editing application for editing photograph data or the like. On the application 200, a user specifies a particular RGB data value for an object, such as text or image data, for which the user wants spot color printing performed. Details of how to specify spot color printing will be described later. Print data generation software 220 is configured by a print setting reception unit 221, a graphics processing unit 222, a storage unit 223, and a communication unit 224. Also, print preview software 230 is configured by a print preview display unit 231, a print preview control unit 232, a detection unit 233, a preview storage unit 234, and a replacement unit 235.

In the print data generation software 220, the print setting reception unit 221 receives print settings and a setting for instructing activation of the print preview software 230. The print settings are settings for the printing apparatus 102 to perform printing as intended by a user, such as sheet size, sheet type, sheet feed method, roll paper width, and a spot color printing setting. The printing settings and the setting for instructing activation of the print preview software 230 received by the print setting reception unit 221 are stored in the storage unit 223. A print setting reception method will be described later.

In response to a print instruction from the application 200, the print data generation software 220 is activated, and the print data generation software 220 requests the application 200 for intermediate drawn data. The print data generation software 220 is, for example, a printer driver. The application 200 transmits a draw command to an operating system 210, and intermediate drawn data is generated. The intermediate drawn data thus generated is transmitted from the operating system 210 to the print data generation software 220.

Next, the print data generation software 220 activates the print preview software 230 based on the setting that instructs activation of the print preview software 230 which is set by the print setting reception unit 221 and stored in the storage unit 223. Further, based on the print settings stored in the storage unit 223, the graphics processing unit 222 in the print data generation software 220 generates an image used for the print preview software 230 to display a preview image. The image thus generated is stored in the storage unit 223. After the print preview software 230 is activated by the print data generation software 220, the print preview control unit 232 obtains the print preview image stored in the storage unit 223, and the print preview display unit 231 displays the print preview image.

Also, the print setting reception unit 221 can display a region for receiving whether to set spot color printing, and whether to set spot color printing is switched based on an operation performed to that region. Specifically, for example, the print setting reception unit 221 can display a fluorescence pink spot color printing setting. The fluorescence pink spot color printing setting is a region for receiving selection whether to enable spot color printing in which a pixel having an RGB value corresponding to fluorescence pink is printed in fluorescence pink (fluorescence pink spot color printing). Note that in a case where fluorescence pink spot color printing is not enabled, a pixel having the RGB value corresponding to fluorescence pink is printed in a color which is not fluorescence pink.

Thus, the region can be said to be a region for receiving a setting regarding whether to print a pixel having a particular RGB value in fluorescence pink or to print the pixel in a color different from fluorescence pink. The region can also be said to be, for example, a region for receiving a setting regarding whether to print the pixel using a spot color ink or to print the pixel using regular ink, not the spot color ink. In a case where a checkbox is checked to set fluorescence pink spot color printing, instruction information instructing the printing apparatus 102 to perform printing using fluorescence pink is added to print data generated by the print data generation software 220. Then, in a case where the print data having the instruction information added thereto include a pixel with the RGB value corresponding to fluorescence pink, the printing apparatus 102 executes printing using the fluorescence pink spot color ink based on the print data.

In a case where the checkbox is unchecked not to set fluorescence pink spot color printing, instruction information instructing the printing apparatus 102 to perform printing using fluorescence pink is not added to the print data generated by the print data generation software 220. Then, in a case where the print data having the instruction information added thereto include a pixel with the RGB value corresponding to fluorescence pink, the pixel is printed not using the fluorescence pink spot color ink but using only regular ink. Note that print settings for other spot colors may be displayed similarly to the fluorescence pink spot color printing setting.

Also, the print preview software 230 has a spot color preview function. The print preview software 230 has a function to display a "spot color region" (a special color region) based on the spot color printing setting set by the print setting reception unit 221 and stored in the storage unit 223, the spot color region indicating where in the image the spot color ink is used. Further, the print preview software 230 detects a "spot color's approximate color region" from pixel regions in the vicinity of the spot color region, the spot color's approximate color region being a region with a pixel of an RGB value for which the spot color ink is not used and which approximates to the RGB value specifying a spot color ink. Then, the print preview display unit 231 in the print preview software 230 has a notification function to notify a user that there is a spot color's approximate color region.

Note that in the present embodiment, a color is said to be an "approximate" color of a target color in a case where its color difference from the target color is within a predetermined range, the color difference being based on RGB values converted in a predetermined color space. Details will be described later. Also, although eight pixels adjacently surrounding a target pixel are used as a range to determine the "vicinity" in the present embodiment, four pixels adjacently surrounding a target pixel may also be used as the range. Also, a plurality of adjacent pixels may be used as the range.

Further, in the print preview software 230, the replacement unit 235 has a replacement function to replace a pixel value (an RGB value) in the spot color's approximate color region so that it is printed using the spot color ink. The spot color preview function allows a user to check a location where the spot color ink is used prior to printing. Further, the notification function allows the user to see that there is a spot color's approximate color region in the vicinity of the region where the spot color ink is to be used and to avoid an unintended printing result. Also, the replacement function allows the user to revise the spot color's approximate color region easily. Details of the spot color preview function, the notification function, and the replacement function described above will be described later.

Next, the user can check a print image, a spot color preview, and a print layout displayed by the print preview display unit 231 of the print preview software 230 and give a print instruction. After receiving a print instruction, the print preview software 230 gives a print start notification to the print data generation software 220. Upon receipt of the print start notification, the print data generation software 220 converts the intermediate drawn data into a data format interpretable by the printing apparatus 102 through a rendering engine that the operating system 210 or the graphics processing unit 222 includes. The converted print data is transmitted to the printing apparatus 102 via the communication unit 224, along with the print settings including the spot color printing setting. After that, based on the print data and the print settings received, the printing apparatus 102 ejects ink from a print head to a printing medium being fed thereto and thereby forms an image. In this event, in a case where the print settings have a setting indicating to use the spot color ink, the printing apparatus 102 prints the region corresponding to the spot-color specified color in the print data by using the spot color ink. The spot-color specified color is a color specified by an RGB value corresponding to a spot color and is a color printed in the spot color.

Next, a specific procedure for creating print data for performing spot color printing is described. In performing spot color printing, on the application 200, the user creates content to be printed and specifies an RGB value corresponding to a spot color ink for text or graphics data that the user wants printed using the spot color ink. In the present embodiment, a case where the spot color printing setting is enabled on the print setting reception unit 221 of the print data generation software 220 is described, assuming, as an example, that the printing apparatus 102 can use two spot color inks: a fluorescence pink ink and a fluorescence orange ink. In a case where the spot color printing setting is enabled and the RGB value of a pixel included in the print data to be transmitted to the printing apparatus is R=255 (0xFF), G=0 (0x00), B=255 (0xFF), the printing apparatus 102 performs spot color printing using the fluorescence pink ink. Also, in a case where the spot color printing setting is enabled and the RGB value of a pixel included in the print data to be transmitted to the printing apparatus is R=255 (0xFF), G=85 (0x55), B=0 (0x00), the printing apparatus 102 performs spot color printing using the fluorescence orange ink. Note that these RGB data values corresponding to the spot color inks and the combination of the spot colors are merely examples, and are not intended to limit the present embodiment.

Figure 3:
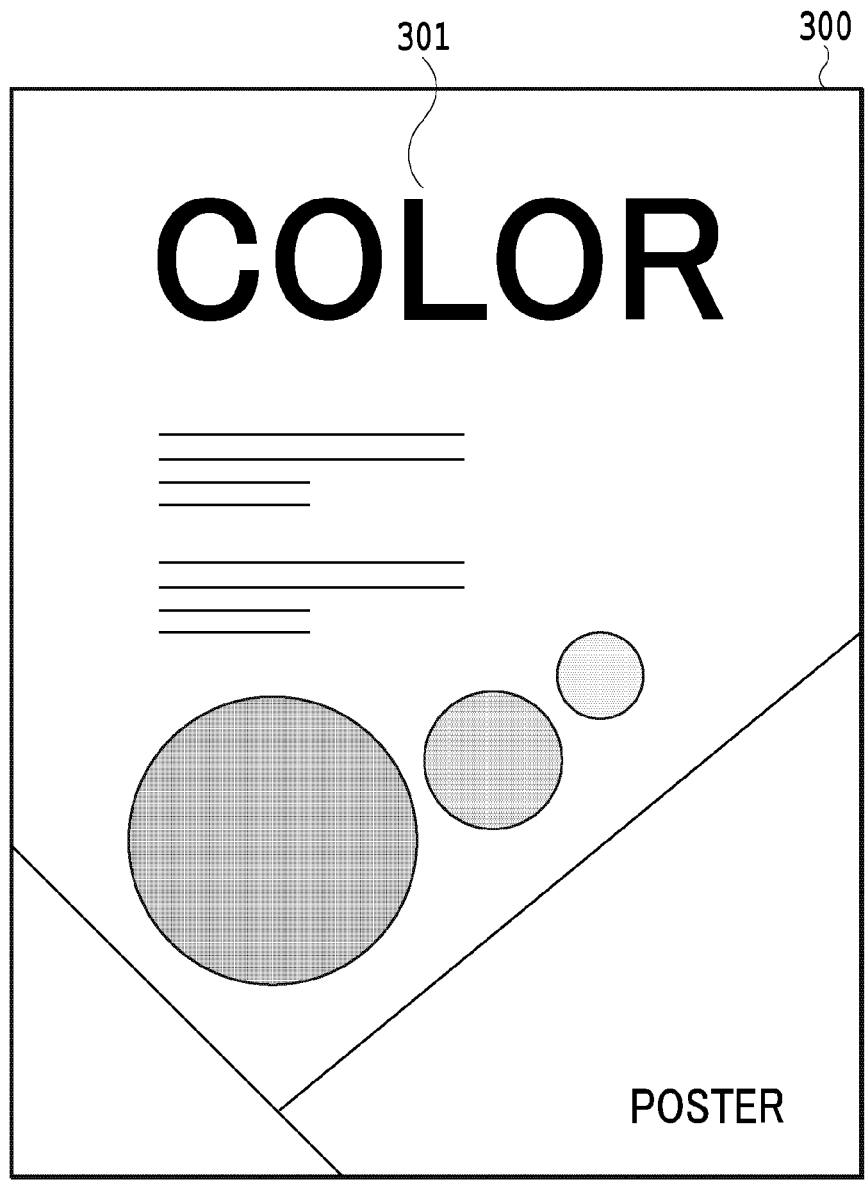
FIG. 3 is a diagram showing poster data.

FIG. 3 is a diagram showing poster data 300 created on the application 200. The RGB value of a text string "COLOR" 301 is R=255 (0xFF), G=0 (0x00), B=255 (0xFF) so as to instruct to print the text with the fluorescence pink ink, which is a spot color ink. Objects other than the text string "COLOR" 301 for which printing using the fluorescence pink ink is instructed have RGB values other than R=255 (0xFF), G=0 (0x00), B=255 (0xFF).

Note that in the present embodiment, a data generation color space of the application 200 and a color space for an image generated by the graphics processing unit 222 of the print data generation software 220 are a standard RGB (sRGB) color space. Also, influence by color matching is not considered here for the sake of simplification of description. The data generation color space of the application 200 and a color space for the print data generated by the rendering engine of the operating system are also the standard RGB (sRGB) color space. Also, influence by color matching is not considered here for the sake of simplification of description. In other words, RGB values included in the print data generated on the application 200 are the same as those in image data generated by the graphics processing unit 222 of the print data generation software and those of image data generated by the rendering engine of the operating system. Thus, print data specified by R=255 (0xFF), G=0 (0x00), B=255 (0xFF) on the application 200 is transmitted to the printing apparatus 102 while keeping the same RGB value and is printed in the fluorescence pink spot color.

Next, a description is given of what could occur in a case where data for which spot color specification is made on the application 200 includes an anti-aliased object or an object containing compression noise such as an image the in JPEG format.

Figure 4B:
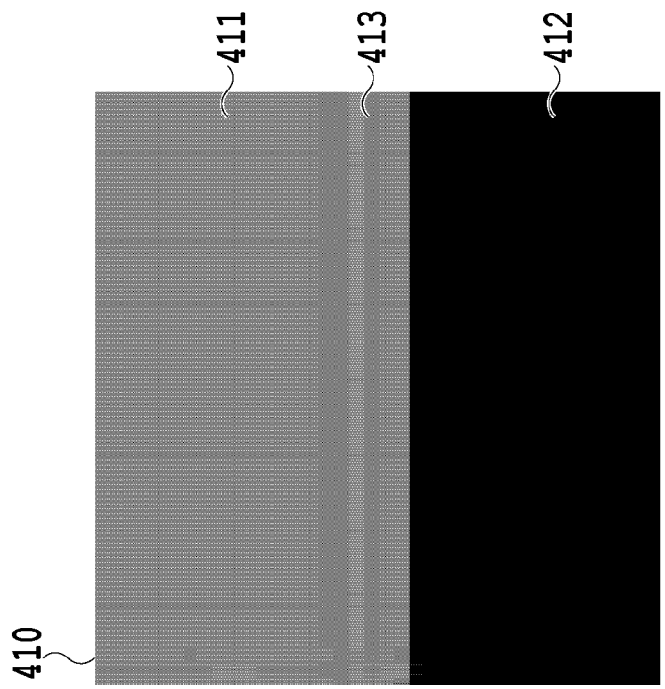
FIG. 4B is a diagram showing image data.
Figure 4A:
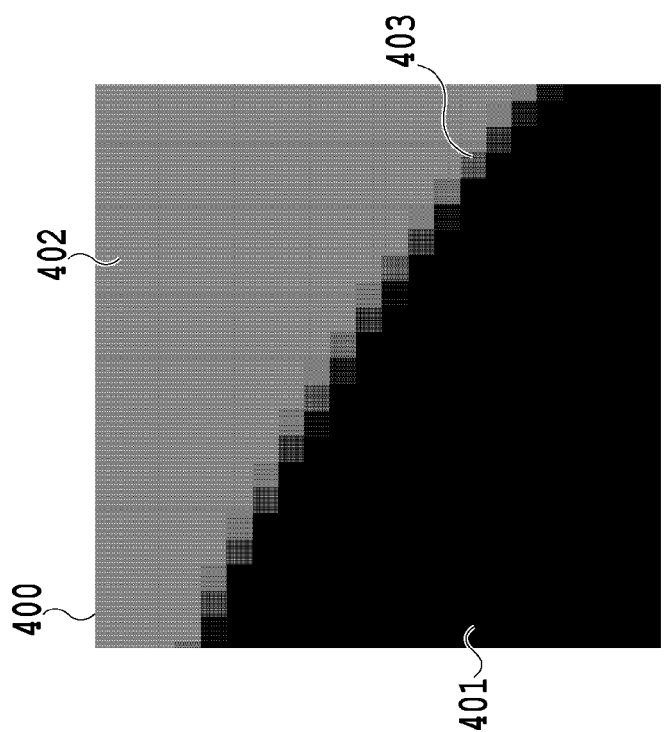
FIG. 4A is a diagram showing image data.

FIGS. 4A and 4B are diagrams showing image data 400 and image data 410, respectively, that are created on the application 200. The image data 400 includes an object 401 and an object 402. In order to perform spot color printing, R=255 (0xFF), G=0 (0x00), B=255 (0xFF), which is the fluorescence pink spot-color specified color, is specified for the object 401. Also, the object 401 is anti-aliased to represent a smooth image, and border pixels 403 are provided. The border pixels 403 and the object 402 are drawn in pixel values other than R=255 (0xFF), G=0 (0x00), B=255 (0xFF), which is the fluorescence pink spot-color specified color.

As a result of the printing apparatus 102 printing the image data 400 created on the application 200, the object 401 portion is printed in the fluorescence pink spot color. Meanwhile, the object 402 portion and the border pixels 403 are printed not using the fluorescence pink spot color but using regular ink corresponding to the pixel values. Also, because a fluorescence ink and a regular ink are represented in different color gamuts, the continuity between the object 401 and the border pixels 403 is lost. As a result, around the border pixels 403, the user may obtain a printing result that they did not intend.

Meanwhile, the image data 410, which is created on the application 200, is an image including an object 411 and an object 412 and compressed in the JPEG format or the like. In order to perform spot color printing, R=255 (0xFF), G=0 (0x00), B=255 (0xFF), which is the fluorescence pink spot-color specified color, is specified for the object 411. Also, there is compression noise (413) generated at a border portion between the object 411 and the object 412. Compression noise is noise generated in an event where an image is compressed to be reduced in data volume, and in a case of an image in the JPEG format, compression noise called block noise or mosquito noise is generated.

Here, for the sake of simplification of description, the pixel values of the compression noise 413 caused by the compression processing have the same RGB value, which is R=210 (0xD2), G=30 (0x1E), B=210 (0xD2). As a result of the printing apparatus 102 printing the image data 410, the object 411 is printed in the fluorescence pink spot color, and the object 412 and the compression noise 413 are printed not using the fluorescence pink spot color, but in regular ink corresponding to the pixel values. Because the spot color is thus not used in part of the object 411, the printing result may turn out not as intended by the user. There are also cases where, for reasons such as compression noise described above, a spot color ink ends up being used for a location where a regular color ink is supposed to be used, and the printing result may turn out not as intended by the user.

In the print data generation software 220, the print setting reception unit 221 can receive various print settings. Although a method in which the print data generation software 220 displays an UI screen and receives settings is described in the present embodiment as an example, it is to be noted that the print setting receiving method is not limited to this.

FIG. 5 is a diagram showing an example of a print settings dialogue 500 for receiving print settings and settings for controlling the print data generation software 220. The print settings dialogue 500 corresponds to the print setting reception unit 221. By making various print settings on the print settings dialogue 500, a user can obtain a desired printed copy from the printing apparatus 102. A number-of-copies setting 501 is a control for setting the number of copies to print. A sheet size setting 502 is a control for selecting the size of sheet printed by the printing apparatus 102, such as "A1" or "A2." A sheet type setting 503 is a control for selecting the type of sheet printable by the printing apparatus 102 from a list, such as plain paper and coated paper.

A print quality setting 504 is a control for setting an item corresponding to the resolution in which the printing apparatus 102 performs printing, such as "NORMAL" and "HIGH." A sheet feed method setting 505 is a control for selecting a sheet feed method used by the printing apparatus 102 from a list, such as "roll paper" and "cut paper." A roll paper width setting 506 is a control for selecting, from a list, the width of roll paper fed by the printing apparatus 102 in a case where roll paper is selected as the paper feed method.

A spot color printing setting 507 corresponds to the checkbox mentioned earlier in the description for the print setting reception unit 221. In a case where the checkbox is checked, spot color printing is performed using fluorescence pink. In a case where the checkbox is checked and the print data generated by the print data generation software 220 includes a pixel with the RGB value corresponding to the fluorescence pink spot color, the printing apparatus 102 prints the pixel using the fluorescence pink spot color ink. Meanwhile, in a case where the checkbox is unchecked, the fluorescence pink spot color ink is not used. In this case, in a case where the print data generated by the print data generation software 220 includes a pixel with the RGB value corresponding to the fluorescence pink spot color, an image in which the RGB value is represented by ink of regular colors such as CMYK is formed.

In a case where the checkbox for a spot color printing setting 508 is checked, printing is performed using the fluorescence orange spot color ink. In a case where the checkbox is checked and the print data generated by the print data generation software 220 includes a pixel with the RGB value corresponding to the fluorescence orange spot color, the printing apparatus 102 prints the pixel using the fluorescence orange spot color ink. Meanwhile, in a case where the checkbox is unchecked, the fluorescence orange spot color ink is not used. In this case, in a case where the print data generated by the print data generation software 220 includes a pixel with the RGB value corresponding to the fluorescence orange spot color, an image in which the RGB value is represented by ink of process colors such as CMYK is formed.

The print preview software 230 is activated in a case where printing is instructed on the application 200 with the checkbox for a print preview activation setting 509 being checked. In a case where the checkbox for the print preview activation setting 509 is unchecked, the print preview software 230 is not activated. A cancel button 510 closes the print settings dialogue 500 without holding the print settings changed on print settings dialogue 500. An OK button 511 closes the print settings dialogue 500 after storing the print settings changed on the print settings dialogue 500 in the storage unit 223.

In a case where the application 200 instructs printing to the print data generation software 220 with the checkbox for the print preview activation setting 509 of the print settings dialogue 500 being checked, the print preview software 230 is activated.

Figure 6:
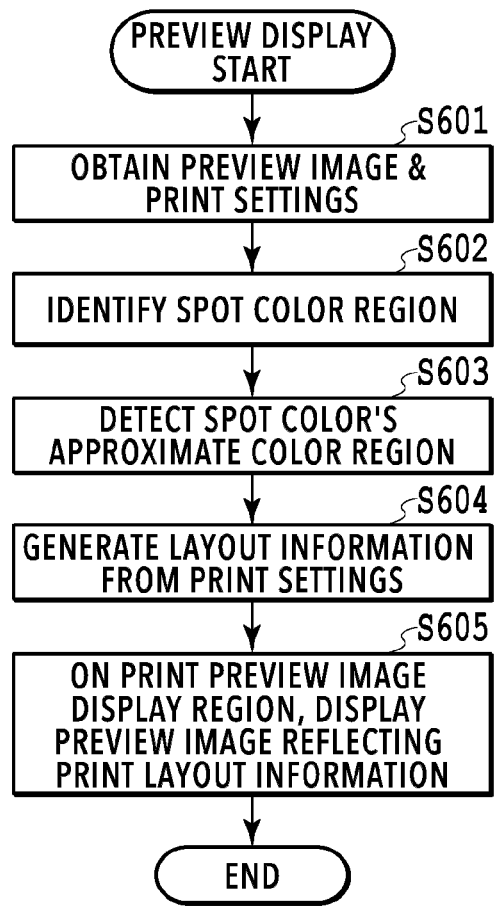
FIG. 6 is a flowchart showing preview display processing.

FIG. 6 is a flowchart showing preview display processing performed by the print preview control unit 232. Using the flowchart in FIG. 6, the following describes preview display processing of the present embodiment. Note that the present processing is implemented by the CPU 111 performing processing in conformity to the procedures in the programs stored in the ROM 112. Alternatively, some or all of the functions in the steps in FIG. 6 may be implemented by hardware such as an ASIC or an electronic circuit. Note that the letter "S" in the description of each processing denotes a step in the flowchart.

Once the preview display processing starts, in S601, based on the processing by the CPU 111, the print preview software 230 obtains, from the storage unit 223, print settings and a preview image generated by the graphics processing unit 222 in the print data generation software 220. Next, in S602, based on the processing by the CPU 111, the print preview software 230 performs spot color region identification processing on the preview image obtained in S601 and stores the identification result in the preview storage unit 234. Further, in S603, based on the processing by the CPU 111, the print preview software 230 performs spot color's approximate color region detection processing based on the preview image obtained in S601 and the spot color region identified in S602. Note that the spot color's approximate color region is a region located around a spot color region and having a RGB value approximating to but not being the same as the RGB value corresponding to the spot color. The spot color's approximate color region is printed not in the spot color but in a process color. The detection result is then stored in the preview storage unit 234. Descriptions of the spot color region identification processing and the spot color's approximate color region detection processing will be given later.

Next, in S604, based on the processing by the CPU 111, the print preview software 230 generates layout information for displaying a preview screen based on the print settings obtained, such as a sheet size, a sheet feed method, and a roll paper width. Further, in S605, based on the processing by the CPU 111, the print preview software 230 displays a preview image using the layout image generated in S604 and ends the processing.

Figure 7:
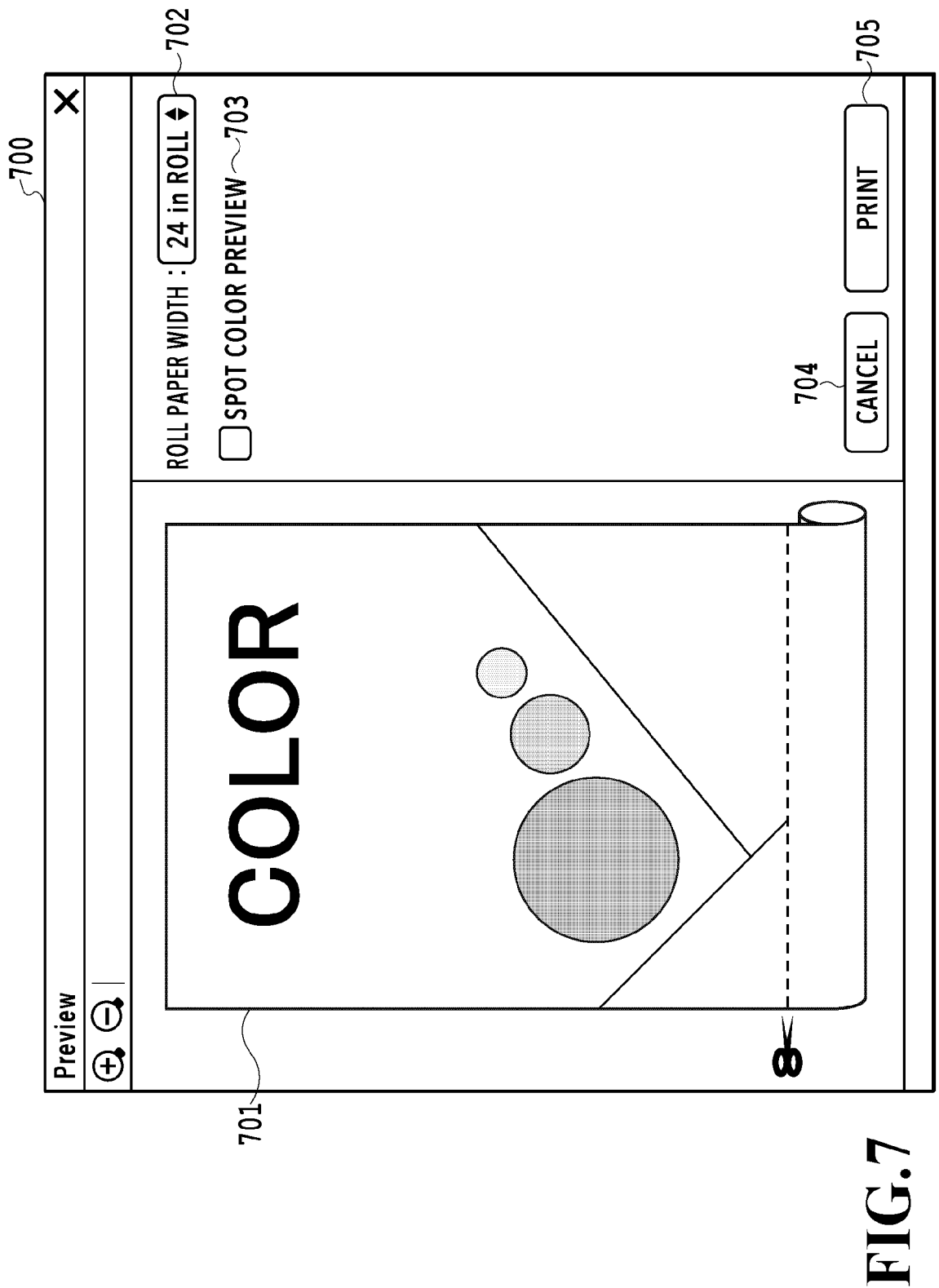
FIG. 7 is a diagram showing an example of a preview screen displayed by a print preview display unit.
Figure 8:
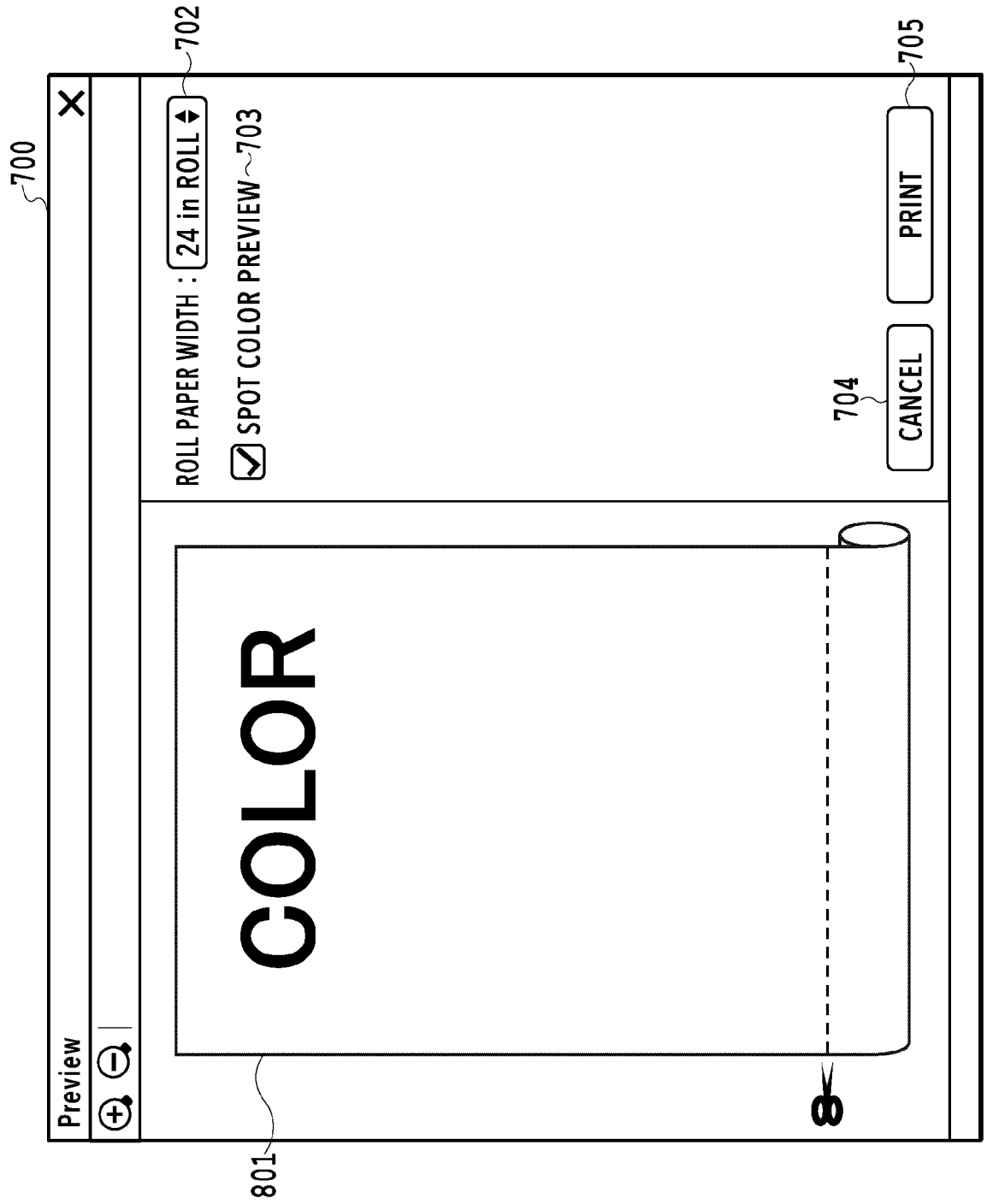
FIG. 8 is a diagram showing an example of a screen displayed after a switch to a spot color preview.

FIG. 7 is a diagram showing an example preview screen 700 displayed by the print preview display unit 231 in the print preview software 230. Also, FIG. 8 is a diagram showing an example screen displayed after a switch is made to a spot color preview on the preview screen of the print preview software 230.

A display region 701 displays a preview image based on the layout information generated in S604 in FIG. 6. A roll paper width control 702 is a control for displaying roll paper width stored in the storage unit 223 as a print setting. By operating the roll paper width control 702, a user can change the roll paper width stored in the storage unit 223 to a different roll paper width printable by the printing apparatus 102. The changed setting is stored in the preview storage unit 234 of the print preview software 230. A checkbox 703 is a checkbox for displaying a spot color preview, and the spot color region identified in S602 is displayed in a case where the checkbox is checked.

A spot color display region 801 shows an example of how a spot color is displayed. In the image displayed, the pixel value in the spot color region identified in S602 is extracted from the preview image obtained in S601, and regions other than the spot color region are displayed as white pixels (R=255 (0xFF), G=255 (0xFF), B=255 (0xFF)). Further, in a case where there is a spot color's approximate color region in S603, after the spot color preview checkbox 703 is checked on the preview screen 700 in FIG. 7, a spot color's approximate color region preview displaying an image showing the spot color's approximate color region is displayed. The spot color's approximate color region preview will be described later.

Note that the present embodiment is configured to present a spot color's approximate color region preview in a case where there is even one pixel of a spot color's approximate color region. However, as an alternative configuration, a spot color's approximate color region preview may be displayed in a case where the number of pixels of the spot color's approximate color region detected in S603 equals or exceeds a minimum detection pixel count defined in advance.

Next, in an event where a cancel button 704 is pressed, the preview screen 700 is closed to cancel printing. In an event where a print button 705 is pressed, the preview screen 700 is closed, and then printing is started. In this event, in a case where the roll paper width has been changed at the roll paper width control 702, changed information stored in the preview storage unit 234 is reflected in the storage unit 223 of the print data generation software 220, and printing is started using the changed print settings.

Figure 9:
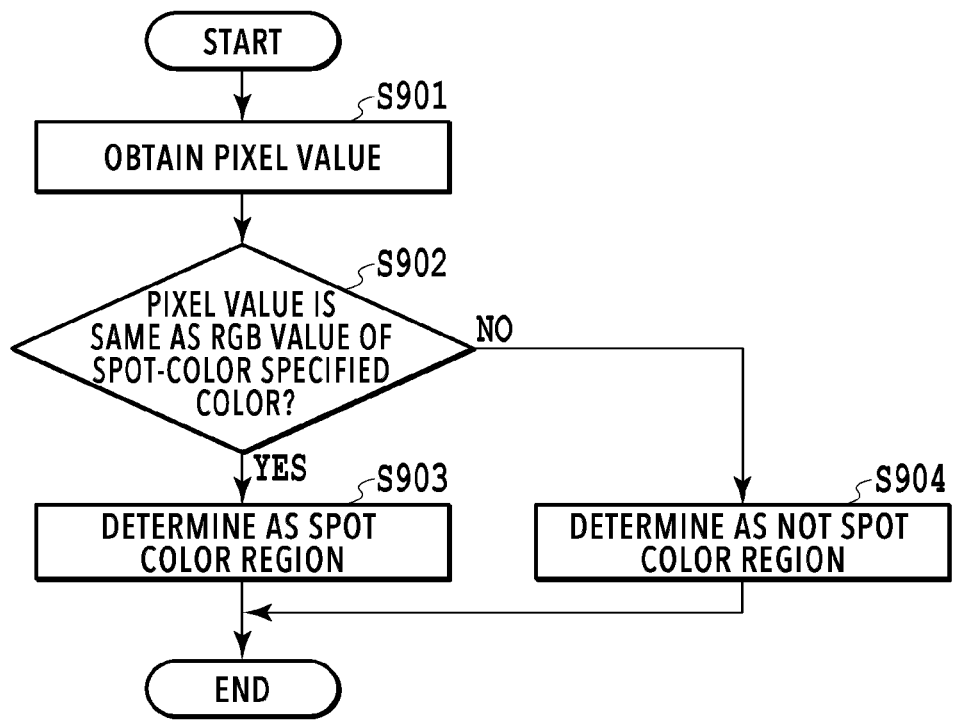
FIG. 9 is a flowchart showing spot color region identification processing.

FIG. 9 is a flowchart showing the spot color region identification processing performed in S602 in FIG. 6. The print preview software 230 identifies a spot color region in the preview image obtained in S601 (performs special color region identification) by scanning all the pixels of the preview image and processing the pixels one by one through application of the series of steps S901 to S904 in FIG. 9 to the pixel. Using the flowchart in FIG. 9, the following describes the preview display processing of the present embodiment. Note that the present processing is implemented by the CPU 111 performing processing in conformity to the procedures in the programs stored in the ROM 112. Alternatively, some or all of the functions in the steps in FIG. 9 may be implemented by hardware such as an ASIC or an electronic circuit. Note that the letter "S" in the description of each processing denotes a step in the flowchart.

Once the spot color region identification processing is started, in S901, based on processing by the CPU 111, the print preview software 230 obtains the pixel value of a scanned pixel. After that, in S902, the print preview software 230 determines whether the pixel value obtained in S901 is the same as the RGB value of the spot-color specified color specified with the spot color setting 507, 508. If it is determined that they are the same, the processing proceeds to S903, and if it is determined that they are not the same, the processing proceeds to S904.

In a case where the processing has proceeded to S903, the print preview software 230 determines that the target pixel is a spot color region. Then, the print preview software 230 stores, in the preview storage unit 234, the position of the scanned pixel determined as the spot color region in the image and flag information indicating which of the spot-color specified colors the scanned pixel matches. Meanwhile, in a case where the processing has proceeded to S904, the print preview software 230 determines that the scanned pixel is not a spot color region and stores, in the preview storage unit 234, flag information indicating that it is not a spot color region and the position of the target pixel in the image. As an example, a case where the fluorescence pink spot color setting is enabled on the sport color setting 507 in FIG. 5 is described. In a case where the pixel value of the scanned pixel is R=255 (0xFF), G=0 (0x00), B=255 (0xFF), the scanned pixel is determined as a spot color region in the fluorescence pink spot color. Then, the position of the scanned pixel and the flag information corresponding to the fluorescence pink spot color are stored in the preview storage unit 234.

Note that in the present embodiment, a scanned pixel obtained in S901 is determined as a spot color region in a case where the pixel value of the scanned pixel is identical to the RGB value of the spot-color specified color. However, in a case of a configuration in which the printing apparatus 102 performs spot color printing with a margin to enhance robustness of spot color specification, the determination in S902 of whether the scanned value is the same as the spot-color specified color may also be made with a margin taken into consideration. Note that the influence by the anti-aliasing processing and compression noise described above can have an impact even with such a margin.

Figure 10:
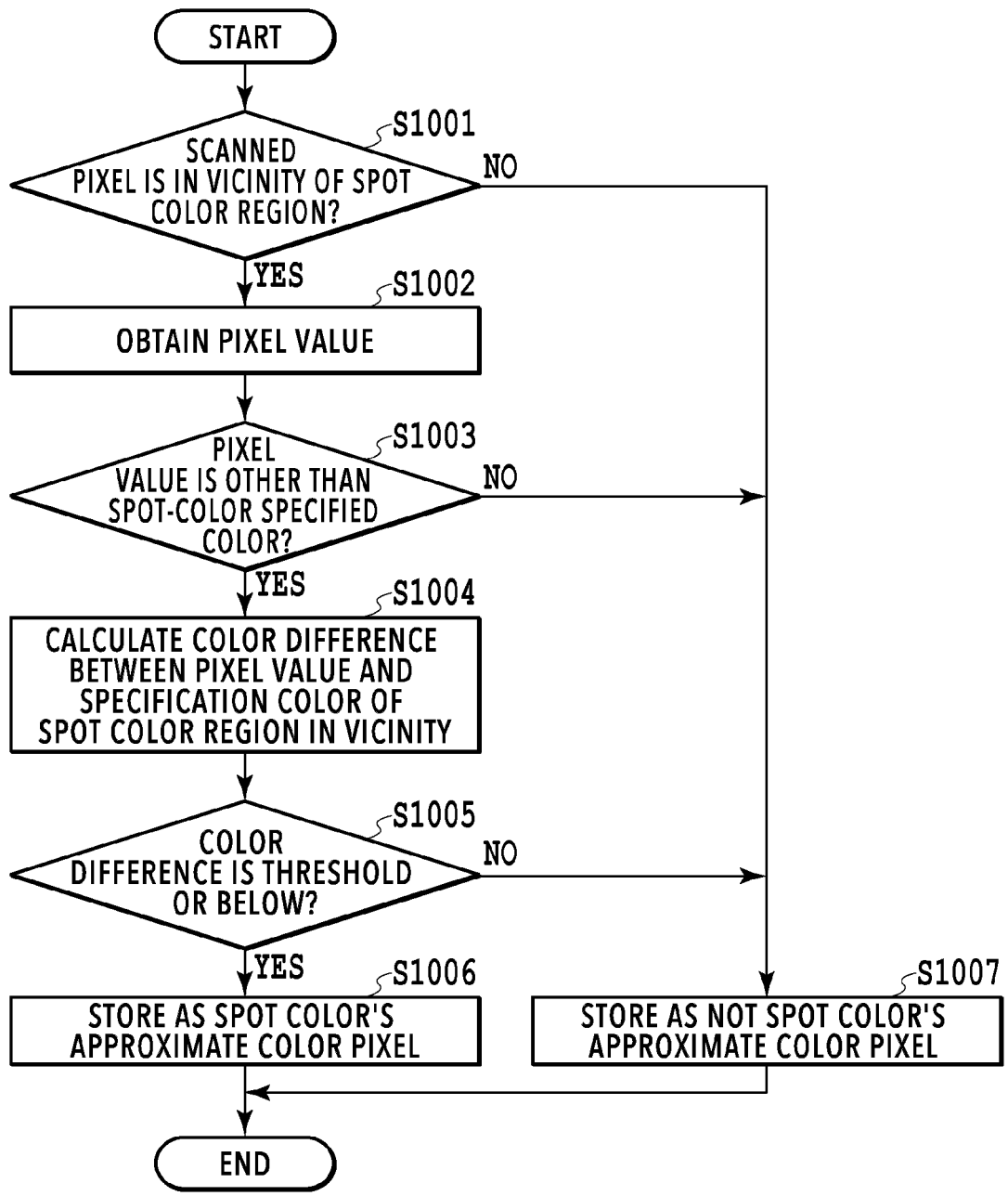
FIG. 10 is a flowchart showing spot color's approximate color region detection processing.

FIG. 10 is a flowchart showing the spot color's approximate color region detection processing. The print preview software 230 detects a spot color's approximate color region by scanning all the pixels of the preview image obtained in S601 and applying the series of steps of determination processing in S1001 to S1107 in FIG. 10 to the pixels one by one. Using the flowchart in FIG. 10, the following describes the preview display processing of the present embodiment. Note that the present processing is implemented by the CPU 111 performing processing in conformity to the procedures in the programs stored in the ROM 112. Alternatively, some or all of the functions in the steps in FIG. 10 may be implemented by hardware such as an ASIC or an electronic circuit. Note that the letter "S" in the description of each processing denotes a step in the flowchart.

Once the spot color's approximate color region detection processing is started, in S1001, based on the processing by the CPU 111, the print preview software 230 determines whether the scanned pixel is in the vicinity of the spot color region determined in S903. Although adjacent surrounding eight pixels of a scanned pixel are used as a range for the determination as to whether the scanned pixel is in the vicinity in the present embodiment, adjacent surrounding four pixels may be used as the range. Also, a plurality of adjacent pixels may be determined as being in the vicinity. If it is determined that the scanned pixel is in the vicinity of the spot color region, the processing proceeds to S1002, and if it is determined that the scanned pixel is not in the vicinity of the spot color region, the processing proceeds to S1007.

Figure 11:
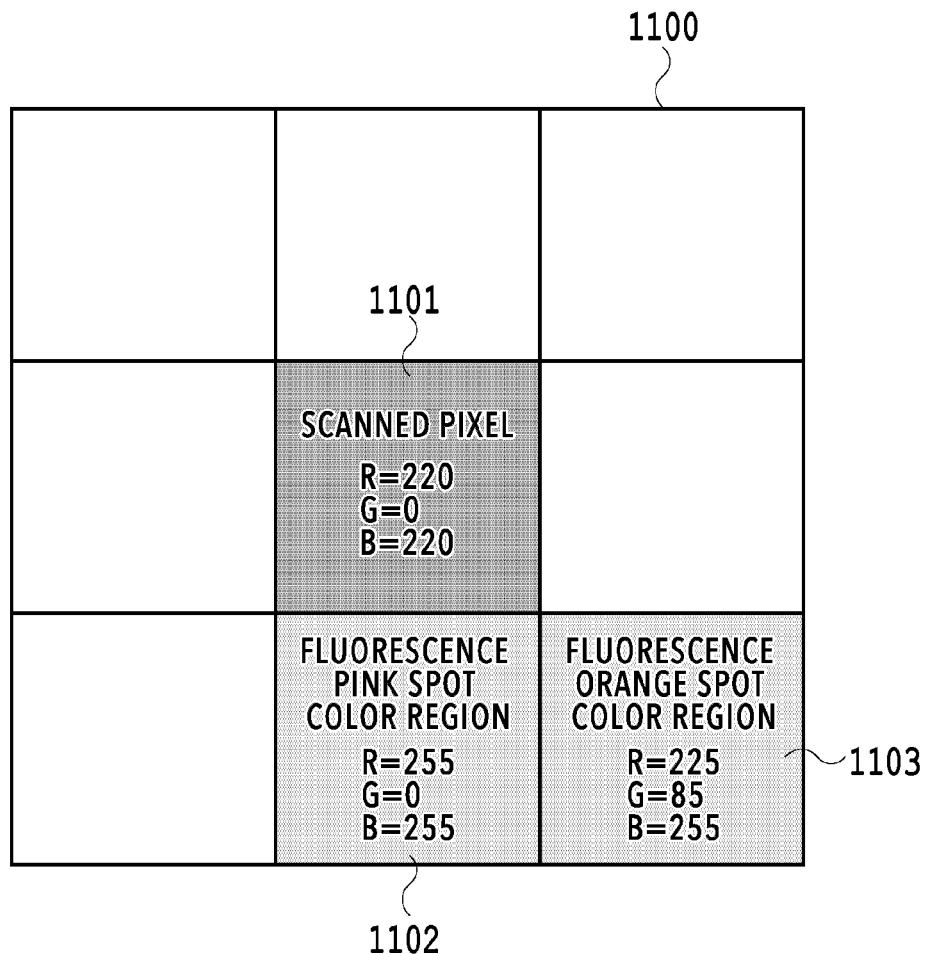
FIG. 11 is a diagram showing an example of pixels in detection of a spot color's approximate color region.

FIG. 11 is used here to describe an example of the determination processing in S1001. FIG. 11 is a diagram showing an example of pixels in detection of a spot color's approximate color region. Pixels 1100 denote eight pixels adjacently surrounding a scanned pixel 1101 in the center. The scanned pixel 1101 is determined to be in the vicinity of the spot color region because there are spot color regions 1102, 1103 determined in S602 among the eight adjacent surrounding pixels.

Back to the flowchart in FIG. 10, if the processing has proceeded from S1001 to S1002, in S1002, based on the processing by the CPU 111, the print preview software 230 obtains the pixel value of the scanned pixel 1101. In this example, the pixel value of the scanned pixel 1101 in FIG. 11 is R=220 (0xDC), G=0 (0x0), B=220 (0xDC).

Next, in S1003, based on the processing by the CPU 111, the print preview software 230 determines whether the pixel value obtained in S1002 is other than the spot-color specified color. If the pixel value is other than the spot-color specified color, the processing proceeds to S1004, and if the pixel value is the spot-color specified color, the processing proceeds to S1007. In the example in FIG. 11, the scanned pixel 1101 is not the same as R=255 (0xFF), G=0 (0x00), B=255 (0xFF), which is the fluorescence pink spot-color specified color specified in the print settings. Because the scanned pixel 1101 is not the same as R=255 (0xFF), G=85 (0x55), B=0 (0x00), which is the fluorescence orange spot-color specified color, either, the processing proceeds to S1004.

Next, in S1004, based on the processing by the CPU 111, the print preview software 230 calculates a color difference between the pixel value obtained in S1002 and the spot-color specified color in the spot color pixel in the vicinity. The color difference is obtained using the following Formula 1.

$$\text{Color difference} = \sqrt{(R_t - R_s)^2 + (G_t - G_s)^2 + (B_t - B_s)^2} \quad \text{(Formula 1)}$$

$R_t$: The value of R in the RGB value of a scanned pixel
$G_t$: The value of G in the RGB value of the scanned pixel
$B_t$: The value of B in the RGB value of the scanned pixel
$R_s$: The value of R in the RGB value of a spot-color specified color the distance to which is to be obtained
$G_s$: The value of G in the RGB value of the spot-color specified color the distance to which is to be obtained
$B_s$: The value of B in the RGB value of the spot-color specified color the distance to which is to be obtained Although a Euclidean distance in an RGB color space is used in the present embodiment as an example of a color difference for the sake of simplification of description, it is to be noted that it is more preferable to use a Euclidean distance in the L*a*b* color system where a more perceptive color difference can be calculated.

Next, in S1005, based on the processing by the CPU 111, the print preview software 230 determines whether or not the color difference calculated in S1004 equals or falls below a threshold stored in the preview storage unit 234 in advance. If the color difference calculated in S1004 equals or falls below the threshold, the processing proceeds to S1006, and if the color difference calculated in S1004 exceeds the threshold, the processing proceeds to S1007.

If the processing has proceeded from S1005 to S1006, in S1006, based on the processing by the CPU 111, the print preview software 230 determines that the scanned pixel is a spot color's approximate color region. Then, position information on the scanned pixel and a flag indicating that the scanned pixel is a spot color's approximate color region are stored in the preview storage unit 234, and the processing ends. Meanwhile, if the processing has proceeded from S1005 to S1007, in S1007, based on the processing by the CPU 111, the print preview software 230 determines that the scanned pixel is not a spot color's approximate color region. Then, position information on the scanned pixel and a flag indicating that the scanned pixel is not a spot color's approximate color region are stored in the preview storage unit 234, and the processing ends.

In the example in FIG. 11, (Formula 1) yields 49.49 . . . ≈49.5 as the color difference between the color of the scanned pixel 1101 and the fluorescence pink spot-color specified color. Also, (Formula 1) yields 98.36 . . . ≈98.3 as the color difference between the color of the scanned pixel 1101 and the fluorescence orange spot-color specified color. In a case where the threshold prestored in the preview storage unit 234 is 100, the color difference between the scanned pixel 1101 and the fluorescence pink spot-color specified color equals or falls below the threshold. Also, because the color difference between the scanned pixel 1101 and the fluorescence pink spot-color specified color is smaller than the color difference between the color of the scanned pixel 1101 and the fluorescence orange spot-color specified color, the scanned pixel 1101 is determined as an approximate color region for the fluorescence pink spot color.

Although pixels adjacent to a spot color region are targeted for the spot color's approximate color region determination in the present embodiment, it is to be noted that the range targeted for the determination may be widened further. For example, after a spot color's approximate color region is detected by applying the processing in S1001 to S1007 in FIG. 10 to all the pixels, the processing in S1001 to S1007 is applied to all the pixels again. In this event, the determination conditions used in S1001 include, in addition to the condition that the scanned pixel is in the vicinity of a spot color region, a condition that the scanned pixel is in the vicinity of a spot color's approximate color region. This allows the spot color approximation color detection range to be widened further.

Figure 12:
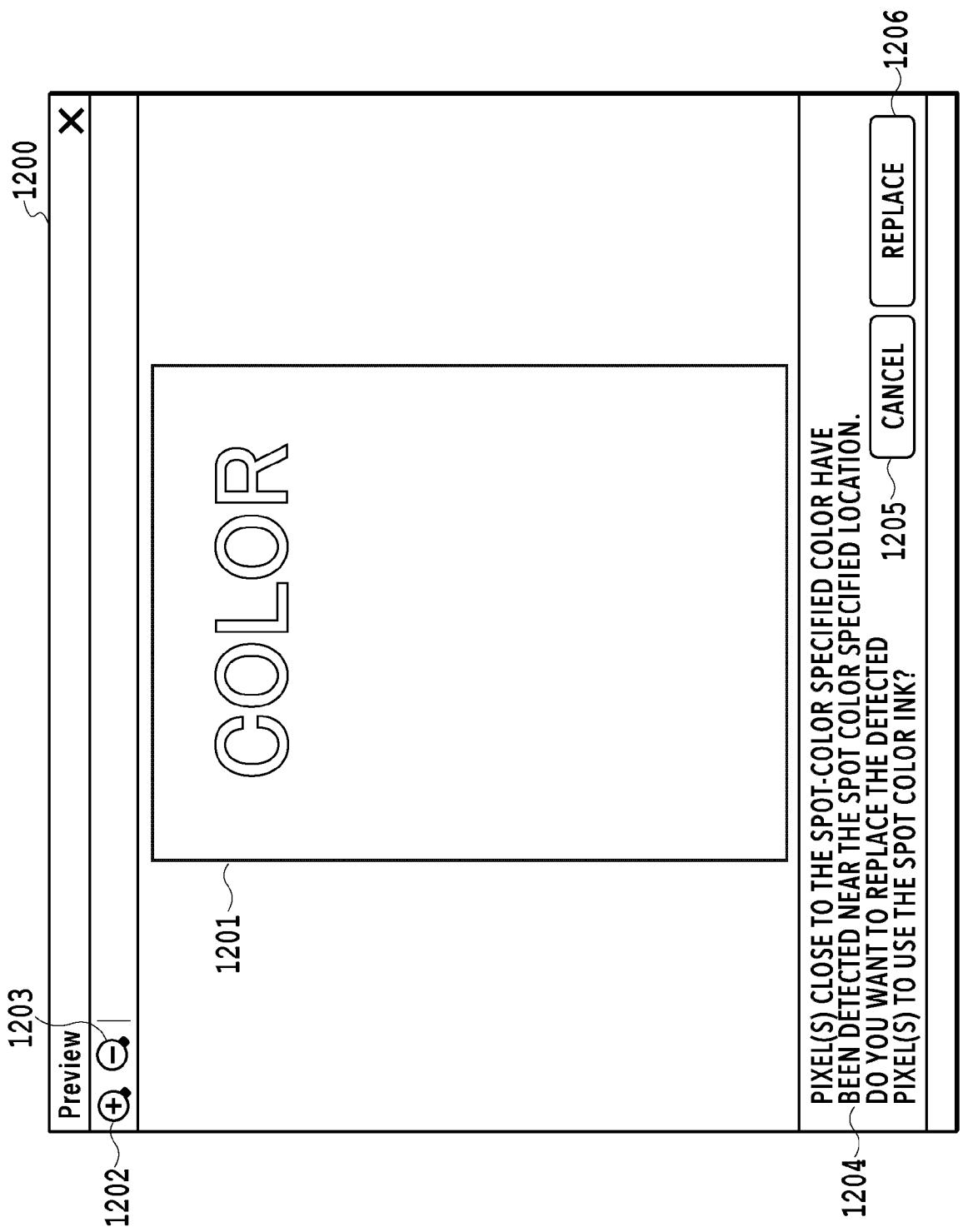
FIG. 12 is a diagram showing a screen displayed upon detection of a spot color's approximate color region.

FIG. 12 is a diagram showing an example screen displayed upon detection of a spot color's approximate color region. A preview screen 1200 is displayed by the print preview display unit 231, and the spot color's approximate color region detected by the processing in FIG. 11 is displayed. A preview image 1201 is a preview image of the spot color's approximate color region and is created using the spot color's approximate color region detected by the processing in S1001 to S1007 in FIG. 10.

The preview image 1201 is displayed based on the position information on the scanned pixels and the flag information indicating that the scanned pixels are a spot color's approximate color region, the position and flag information having been stored in the preview storage unit 234 in S1006 and S1007. The preview image 1201 displays the pixels of the spot color's approximate color region as black pixels (R=0 (0x00), G=0 (0x00), B=0 (0x00)). Also, in the preview image, the non-spot color's approximate color region is displayed as white pixels (R=255 (0xFF), G=255 (0xFF), B=255 (0xFF)).

Although the spot color's approximate color region preview image is formed as a binary image of white pixels and black pixels in the present embodiment, the present invention is not limited to this configuration. The spot color's approximate color region may be represented by the pixel values of the original preview image obtained in S601 or in a predetermined color.

A preview zoom-in button 1202 receives an operation for instructing to zoom in on the preview image 1201 of the spot color's approximate color region. A preview zoom-out button 1203 receives an operation for instructing to zoom out of the preview image 1201 of the spot color's approximate color region. A message 1204 is a message for notifying a user that a spot color's approximate color region has been detected. The message 1204 may further include a message prompting a user to determine (asking a user) whether to replace the spot color's approximate color region with a spot-color specified color. In response to a cancel button 1205 being pressed, the spot color's approximate color region preview is closed.

In response to a replacement button 1206 being pressed, in the print preview software 230, the replacement unit 235 replaces the spot color's approximate color region with the spot-color specified color, and the spot color's approximate color region preview is closed. After that, image data reflecting the replacement result can be printed upon pressing of the print button 705 on the print preview dialogue 700.

In the example shown in FIG. 11, through the processing in S1001 to S1007, the scanned pixel 1101 has been determined as a region in a color approximating to the fluorescence pink spot color. Once the replacement button 1206 is pressed, the pixel value of the scanned pixel 1101 is replaced with a RGB value R=255 (0xFF), G=0 (0x00), B=255 (0xFF), which is the fluorescence pink spot-color specified color. As a result, the pixel value of the scanned pixel 1101 is printed by the printing apparatus 102 using ink of the fluorescence pink spot color.

Although a configuration of replacing a spot color's approximate color region with a spot-color specified color so that the spot color's approximate color region may be printed in the spot color is described in the present embodiment as an example, it is to be noted that the spot color's approximate color region may be replaced by a color of a different value. For example, because a spot color's approximate color region occurring at an anti-aliased portion of an object has a role in giving a smooth representation of the object, a configuration may be employed in which the replacement color is changed to maintain this role.

As thus described, a pixel region for which spot color printing is specified is identified in print data, and it is determined whether pixels surrounding the identified pixel region include a pixel which is in a color approximating to the spot color and whose color difference from the spot color equals or falls below a predetermined value. The user is notified of the spot color's approximate color region thus detected. Thus, an information processing apparatus capable of inhibiting a spot color printing result from turning out not as intended by a user, a control method, and a program can be provided.

Second Embodiment

A second embodiment of the present invention is described with reference to some drawings. Note that because the present embodiment has the same basic configuration as the first embodiment, the following describes only characteristic configurations. The present embodiment employs a configuration such that in the detection of a spot color's approximate color by the detection unit 233 of the print preview software 230, more detailed control is performed using attribute information which is classified depending on the type of a draw command and which is obtainable from intermediate print data. Note that in the present embodiment, the types of draw commands can be classified into three attributes: a text attribute, a graphics attribute such as a line or rectangle, and an image attribute such as an image.

Figure 13:
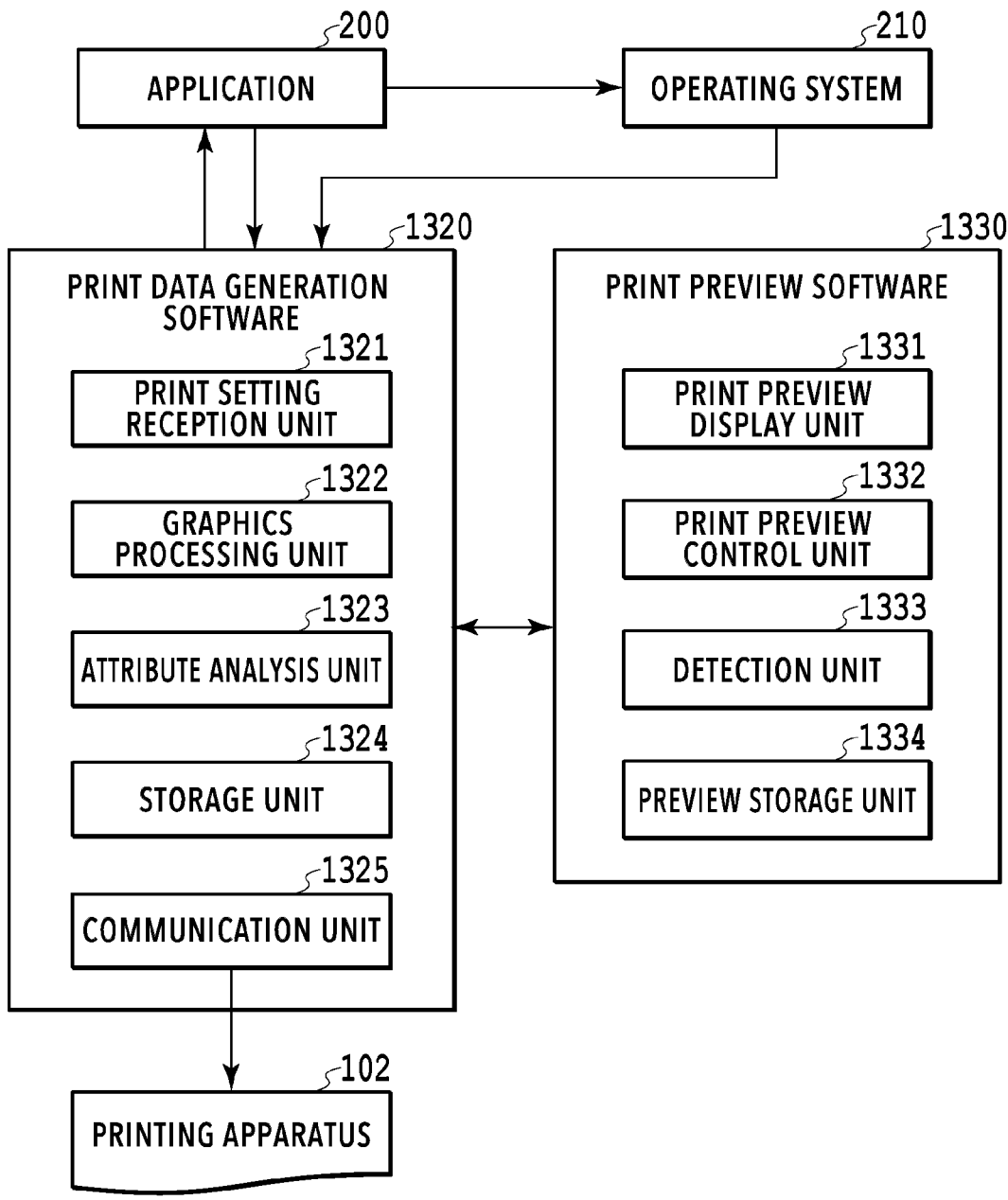
FIG. 13 is a diagram showing the configuration of the printing control system.

FIG. 13 is a diagram showing the configuration of a printing control system of the present embodiment. The application 200, the operating system 210, and the printing apparatus 102 are the same as those in the first embodiment. Also, a print setting reception unit 1321, a graphics processing unit 1322, a storage unit 1324, and a communication unit 1325 of print data generation software 1320 and a print preview display unit 1331 of print preview software 1330 are also the same as those in the first embodiment unless otherwise noted. Further, a print preview control unit 1332, a detection unit 1333, and a preview storage unit 1334 are the same as those in the first embodiment unless otherwise noted.

The print data generation software 1320 has an attribute analysis unit 1323 in addition to the configuration of the print data generation software 220 of the first embodiment. In response to a print instruction from the application 200, the print data generation software 1320 is activated, and the print data generation software 1320 requests the application 200 for intermediate drawn data. The application 200 transmits a draw command to the operating system 210, and intermediate drawn data is generated. The intermediate drawn data thus generated is transmitted from the operating system 210 to the print data generation software 1320. The intermediate drawn data here is data including a draw command in addition to the preview image generated by the graphics processing unit 222.

Next, the print data generation software 1320 activates the print preview software 1330 based on a setting instructing activation of the print preview software 1330, which is set by the print setting reception unit 1321 and stored in the storage unit 1324. Further, in the print data generation software 1320, the graphics processing unit 1322 generates an image from the intermediate drawn data based on the print settings stored in the storage unit 1324. Also, in the print data generation software 1320, the attribute analysis unit 1323 obtains an attribute from the draw command included in the intermediate drawn data (attribute obtainment), the attribute being classified into one of the three attributes. The attribute analysis unit 1323 then generates attribute information data having attributes mapped to respective pixels in the rendered image data.

FIGS. 14A and 14B are diagrams showing an example of how attribute information is stored. Attribute information data 1400 is an extraction of a part of attribute information data, and a flag value indicating an attribute classified in a draw command is written in each of rectangular regions which are pixels. Also, a draw command 1410 shows a table of correspondences between the type of a classified attribute and a flag value. For the types of attributes, NO ATTRIBUTE is linked to a flag value "0," TEXT ATTRIBUTE is linked to a flag value "1," GRAPHICS ATTRIBUTE is linked to "2," and IMAGE ATTRIBUTE is linked to a flag value of "3."

The image and attribute information data created by the graphics processing unit 1322 are stored in the storage unit 1324. Next, the print preview software 1330 is activated by the print data generation software 1320, and the print preview control unit 1332 obtains the print preview image and the attribute information data stored in the storage unit 1324. After that, the print preview software 1330 performs the processing described in FIG. 15 to detect a spot color's approximate color region.

Figure 15:
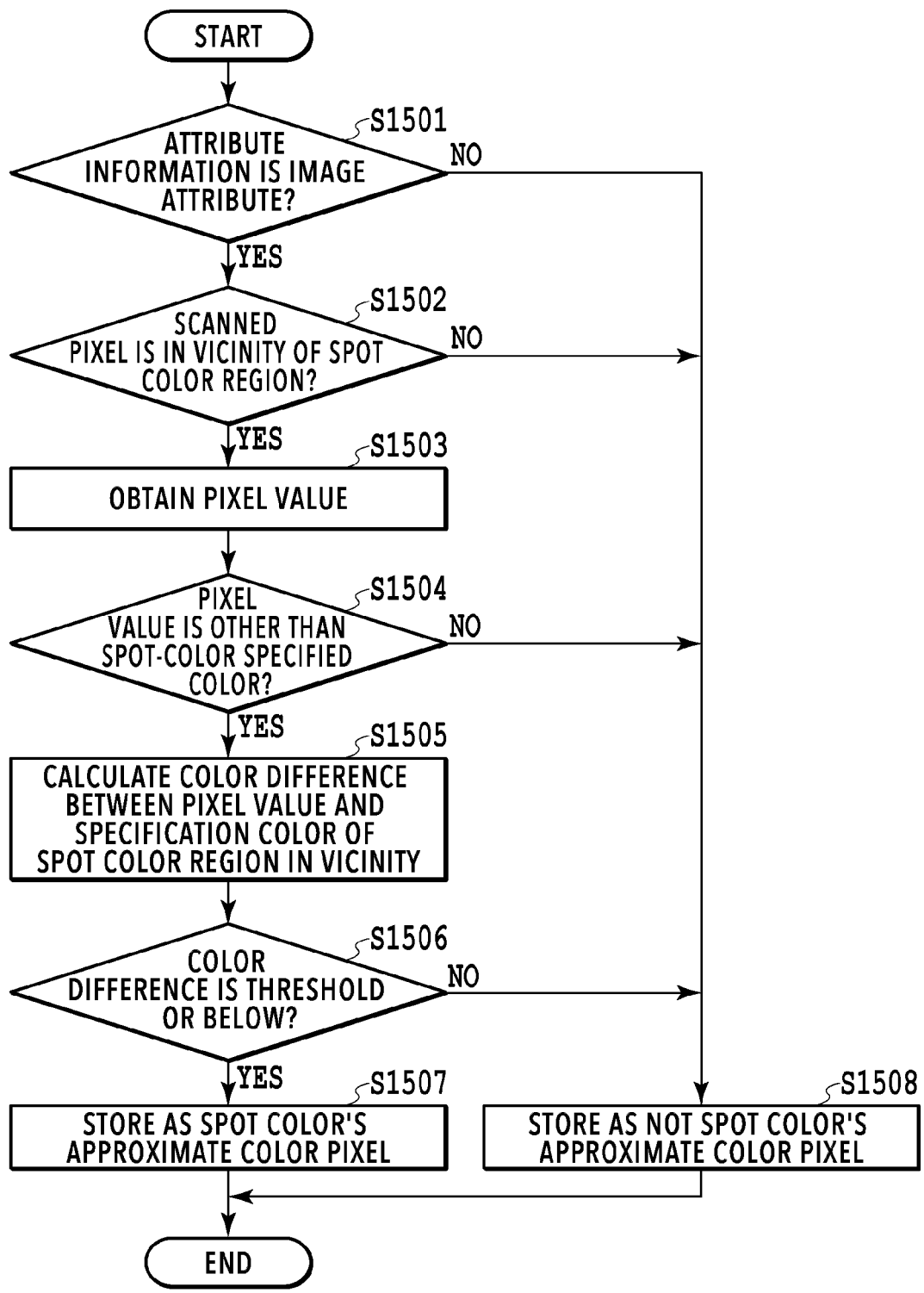
FIG. 15 is a flowchart showing spot color's approximate color region detection processing.

FIG. 15 is a flowchart showing spot color's approximate color region detection processing of the present embodiment, the flowchart having a determination step S1501 added to the top of the preview display processing in FIG. 10 described in the first embodiment. Processing in S1502 to S1508 in FIG. 15 is the same as the processing in S1001 to S1007 in FIG. 10. Using the flowchart in FIG. 15, the following describes the preview display processing of the present embodiment. Note that the present processing is implemented by the CPU 111 performing processing in conformity to the procedures in the programs stored in the ROM 112. Alternatively, some or all of the functions in the steps in FIG. 15 may be implemented by hardware such as an ASIC or an electronic circuit. Note that the letter "S" in the description of each processing denotes a step in the flowchart.

Once the preview display processing is started, in S1501, based on the processing by the CPU 111, the print preview software 1330 determines whether the attribute information on the scanned pixel indicates an image attribute. If it is determined that the attribute information on the scanned pixel is an image attribute, the processing proceeds to S1502, and if it is determined that the attribute information on the scanned pixel is other than an image attribute, the processing proceeds to S1508. After that, in S1502 to S1508, the same processing as that in S1001 to S1007 in FIG. 10 is performed by the print preview software 1330 to detect a spot color's approximate color region.

Although whether a scanned pixel is a spot color's approximate color pixel is determined by determining whether the attribution information is an image attribute in the present embodiment, it is to be noted that the present invention is not limited to this. The determination may be made by including a determination of whether the attribute information is a graphics attribute.

In the embodiment described above, processing using attribute information data is added to the determination of a spot color's approximate color. Thus, only an object with an image attribute, which is susceptible to compression noise, anti-aliasing, and the like, can be targeted for the spot color's approximate color determination, which can improve the accuracy of the spot color's approximate color determination.

Third Embodiment

A third embodiment of the present invention is described below with reference to some drawings. Note that because the present embodiment has the same basic configuration as the first embodiment, the following describes only characteristic configurations. The present embodiment employs a configuration such that in the replacement processing performed using the spot color's approximate color region preview in the first embodiment, a user interface is provided to allow a user to specify a replacement target range. This configuration allows a user to set a replacement target more flexibly.

Figure 16:
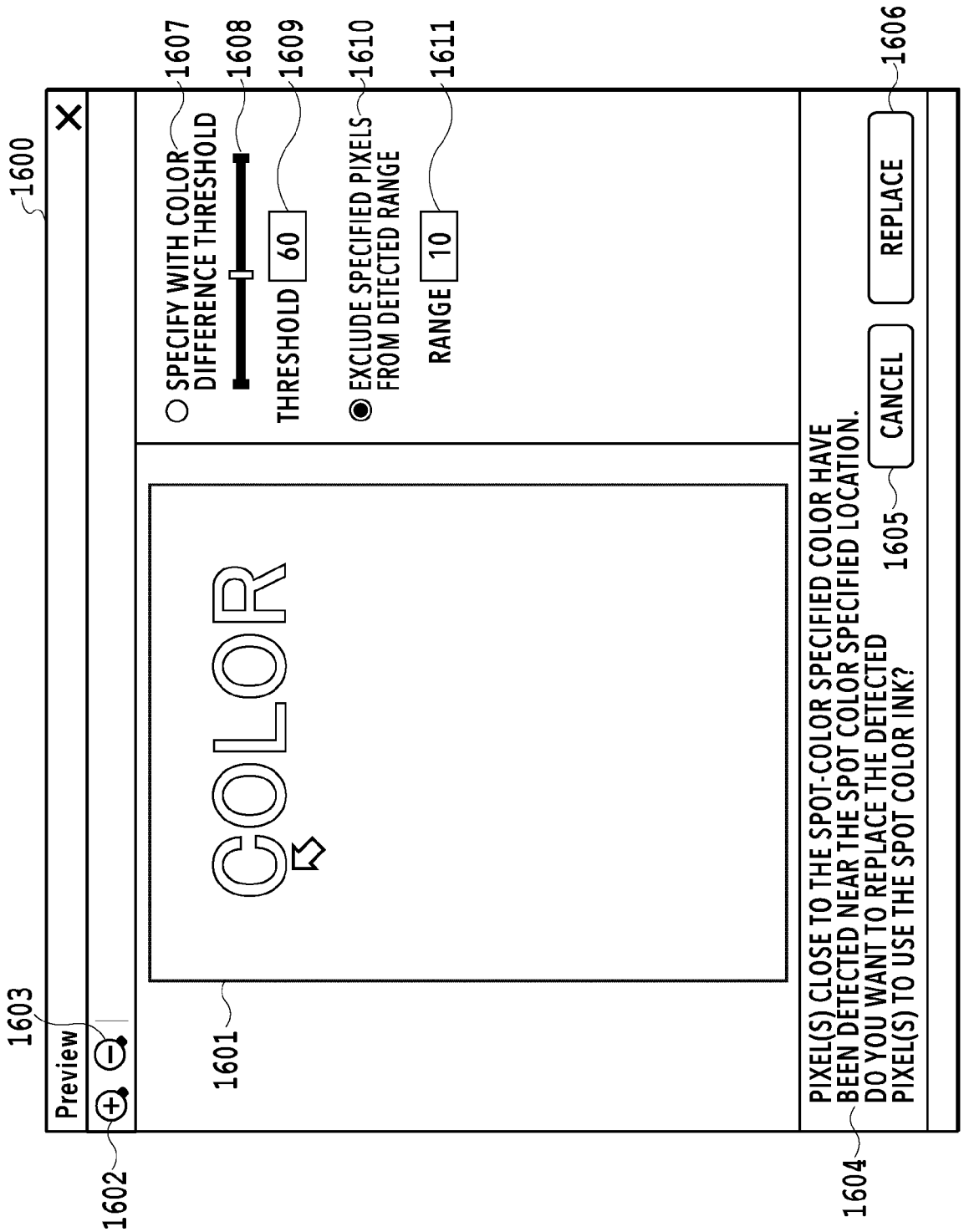
FIG. 16 is a diagram showing an example of a spot color's approximate color region preview.

FIG. 16 shows an example of a spot color's approximate color region preview of the present embodiment. A preview image 1601, a preview zoom-in button 1602, a preview zoom-out button 1603, and a message 1604 are the same as the preview image 1201, the preview zoom-in button 1202, the preview zoom-out button 1203, and the message 1204 described in FIG. 12. A replacement button 1606 and a cancel button 1605 are also the same as the replacement button 1206 and the cancel button 1205 in FIG. 12. A control 1607 is an item with which a color difference threshold can be set, and the setting can be made using a slide bar 1608, a text box 1609, or the like.

A threshold that can be set using the text box (threshold setting unit) 1609 is used in the threshold determination in S1005 in FIG. 10, which is the spot color's approximate color region determination processing. Also, in a case where the threshold is changed, the processing in S1001 to S1007 in FIG. 10 is applied again to detect a spot color's approximate color region again. Changing the threshold enables adjustment of the range based on which the spot color's approximate color region is determined. For example, in a case where the threshold is increased, a pixel value in a color gamut away from the spot-color specified color of the spot color region is also determined as a spot color's approximate color region. Meanwhile, in a case where the threshold is decreased, a spot color's approximate color region is narrowed down to pixel values closer to the spot-color specified color of the spot color region.

Also, a control 1610 is a control with which a certain range of pixels can be excluded from the detected spot color's approximate color range. A pixel value which is the same as a pixel value located at coordinates specified on a preview image using the pointing device 117 or the like can be excluded from the spot color's approximate color region.

It is also possible to have a color difference range specified using a range selection text box 1611 (setting a predetermined range), have coordinates specified on the spot color's approximate color region preview image using the pointing device 117 or the like, collectively select pixel values existing in the color difference range (the predetermined range) specified in the range selection text box 1611 from a pixel value located at the coordinates specified, and exclude those pixel values from the spot color's approximate color region.

Figure 17:
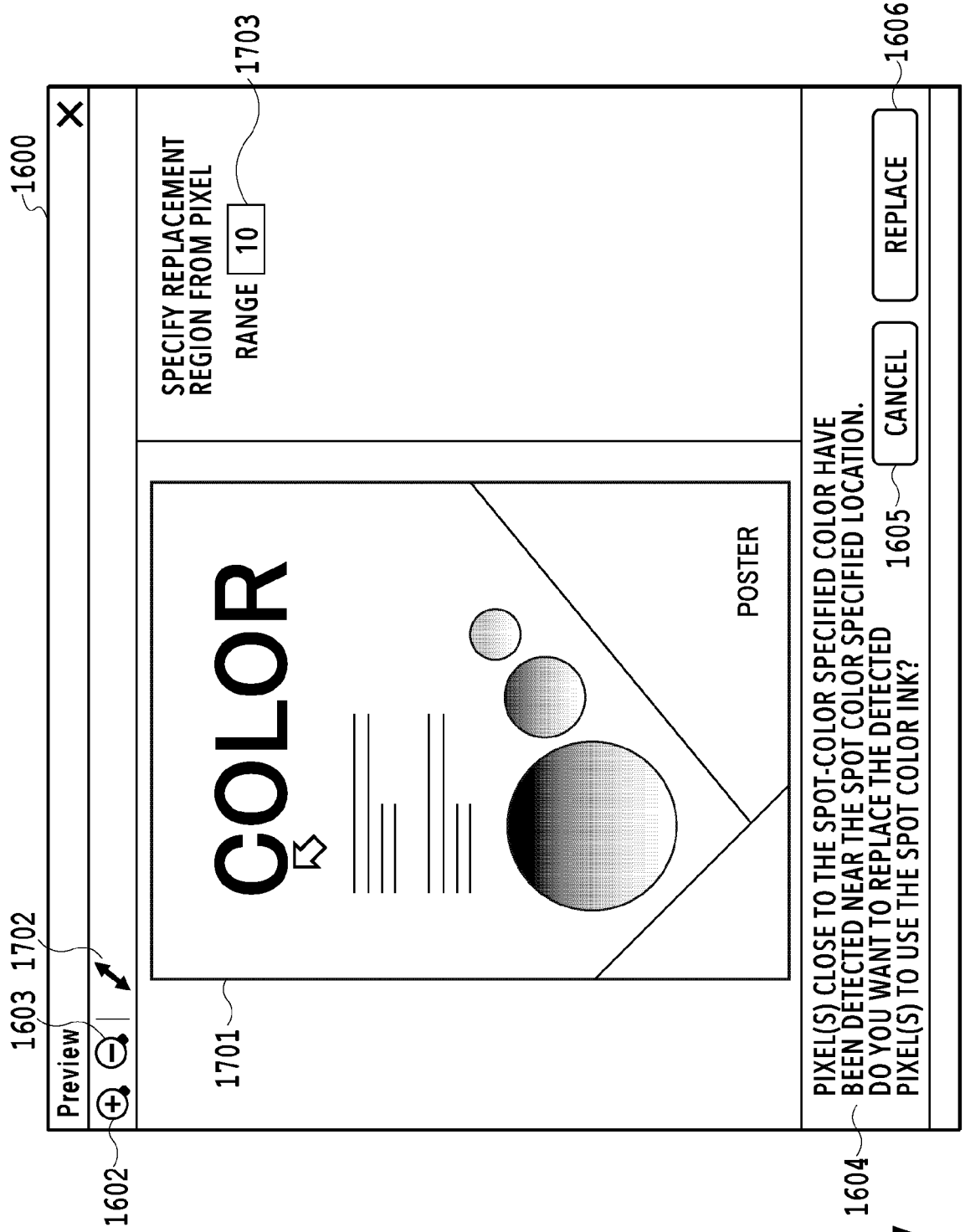
FIG. 17 is a diagram showing a screen displayed after a switch to a spot color's approximate color region preview.

Further, in the present embodiment, a preview image switch button 1702 is provided as shown in FIG. 17, and in response to the switch button being pressed, the spot color's approximate color region preview image is switched to a regular preview image similar to the display region 701 in FIG. 7. In response to coordinates being specified on the regular preview image using the pointing device 117 or the like, a pixel value which is the same as the pixel value located at the coordinates specified is added as a spot color's approximate color region. Also, a color difference range may be specified in a text box 1703, and pixel values within the color difference range specified in the text box 1703 from a pixel value located on the preview image and specified using the pointing device 117 or the like can be selected and added to the spot color's approximate color region.

In this way, a user can set a spot color's approximate color region more flexibly on the spot color's approximate color region preview, and printing can be performed as intended by the user.

Fourth Embodiment

A fourth embodiment of the present invention is described below with reference to some drawings. Note that because the present embodiment has the same basic configuration as the first embodiment, the following describes only characteristic configurations. The present embodiment employs a configuration such that the print data generation software 220 gives a notification so that a notification of presence of a spot color's approximate color region can be given even in a case where the print preview software 230 is not activated.

Figure 18:
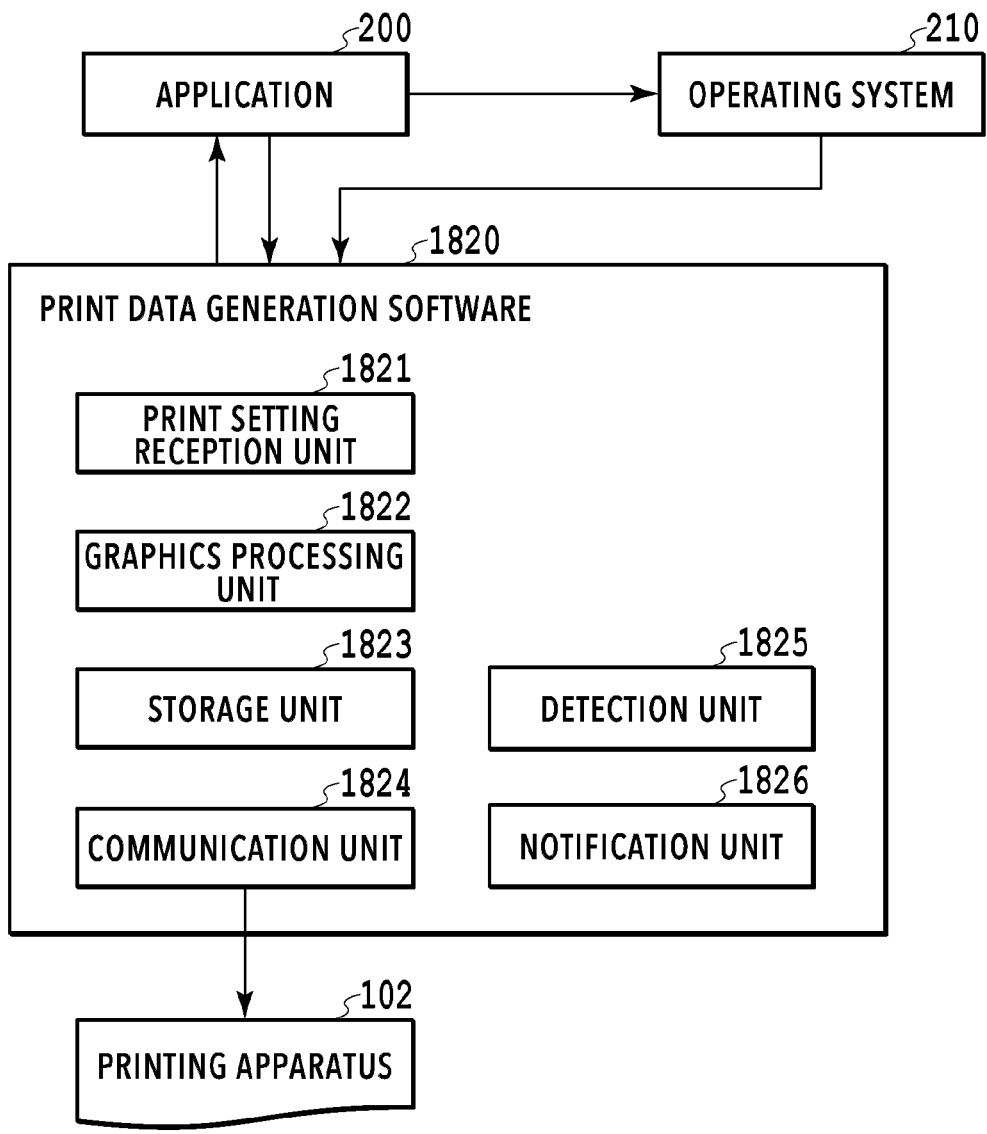
FIG. 18 is a diagram showing the configuration of a printing control system.

FIG. 18 is a diagram showing the configuration of a printing control system of the present embodiment. The application 200, the operating system 210, and the printing apparatus 102 are the same as those in the first embodiment. Also, a print setting reception unit 1821, a graphics processing unit 1822, a storage unit 1823, and a communication unit 1824 of print data generation software 1820 are in the same forms as those in the first embodiment unless otherwise noted.

The print data generation software 1820 has a detection unit 1825 and a notification unit 1826 in addition to the configuration of the print data generation software 220 in the first embodiment. In response to a print instruction from the application 200, the print data generation software 1820 is activated, and the print data generation software 1820 requests the application 200 for intermediate drawn data. The application 200 transmits a draw command to the operating system 210, and intermediate drawn data is generated. The intermediate drawn data thus generated is transmitted from the operating system 210 to the print data generation software 1820.

Figure 19:
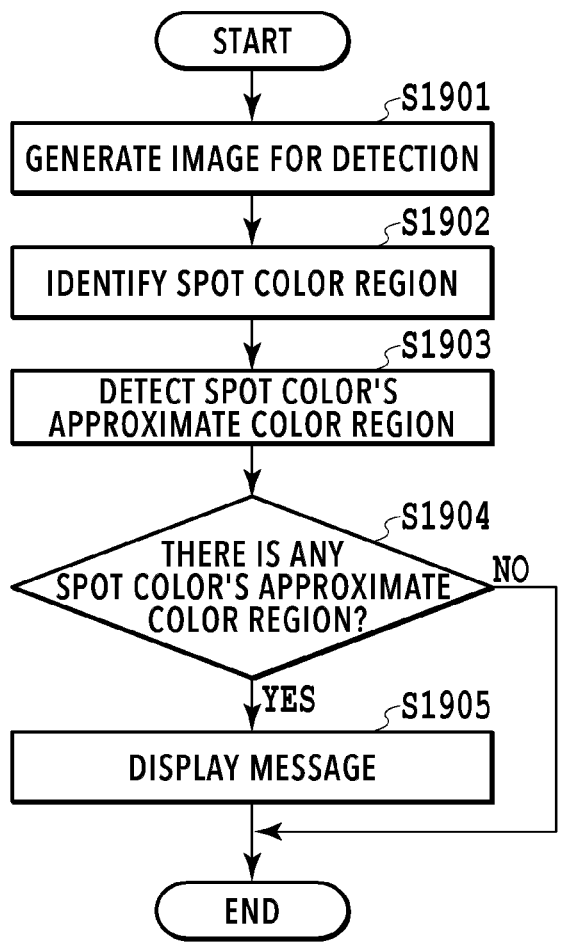
FIG. 19 is a flowchart showing detection result notification processing.

FIG. 19 is a flowchart showing detection result notification processing in the present embodiment. Using the flowchart in FIG. 19, the following describes detection and notification of a spot color's approximate color using intermediate drawn data. Note that the present processing is implemented by the CPU 111 performing processing in conformity to the procedures in the programs stored in the ROM 112. Alternatively, some or all of the functions in the steps in FIG. 19 may be implemented by hardware such as an ASIC or an electronic circuit. Note that the letter "S" in the description of each processing denotes a step in the flowchart.

Once the detection result notification processing is started, in S1901, based on the processing by the CPU 111, the print data generation software 1820 performs the following processing. In the processing, the graphics processing unit 1822 generates an image for identification of a spot color region and detection of a spot color's approximate color region based on the print settings set by the print setting reception unit 1821 and stored in the storage unit 1823. The generated image is stored in the storage unit 1823.

Next, in S1902, based on the processing by the CPU 111, in the print data generation software 1820, the detection unit 1825 identifies a spot color region in the image stored in the storage unit 1823. The method for identifying a spot color region is the same as that in the processing in FIG. 9 described in the first embodiment. Next, in S1903, based on the processing by the CPU 111, the print data generation software 1820 detects a spot color' approximate color region. The method for detecting a spot color's approximate color region is also the same as that in the spot color's approximate color region detection processing in FIG. 10 described in the first embodiment.

Next, in S1904, based on the processing by the CPU 111, the print data generation software 1820 determines whether there is a spot color's approximate color region. If there is a spot color's approximate color region, the processing proceeds to S1905, and if there is no spot color's approximate color region, the processing ends. In S1905, the notification unit 1826 in the print data generation software 1820 gives a notification by displaying a message, and the processing ends.

Figure 20:
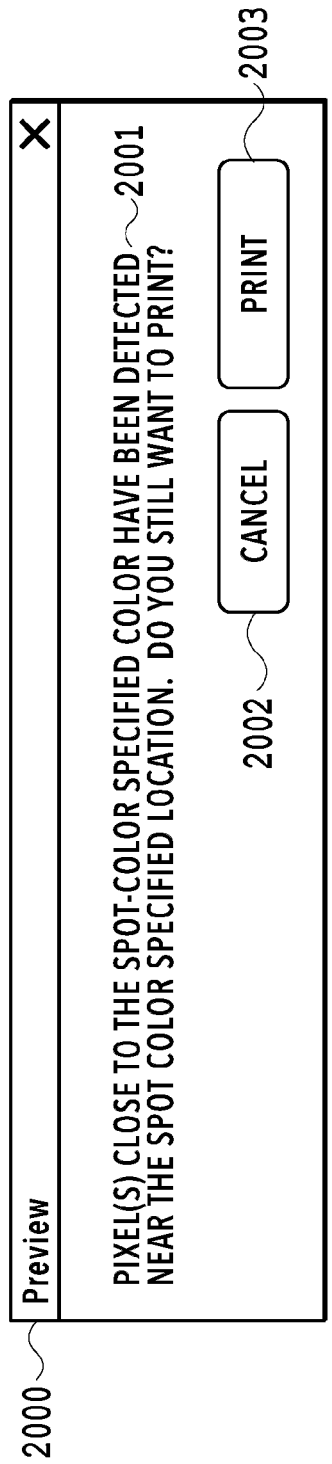
FIG. 20 is a diagram showing an example of a message notification.

FIG. 20 is a diagram showing an example of a message notification. A message dialogue 2000 displays a message notification in a case where it is determined that there is a spot color's approximate color region. A message 2001 is an example of a message for notifying a user that there is a spot color's approximate color region. In response to a cancel button 2002 being pressed, the print data generation software 1820 closes the message dialogue 2000 and cancels printing. In an event where a print button 2003 is pressed, the print data generation software 1820 closes the message dialogue 2000 and starts printing processing.

In this way, a user can know that there is a spot color's approximate color before printing even without a preview screen displayed, which makes it possible to avoid unintended spot color printing.

Fifth Embodiment

A fifth embodiment of the present invention is described below with reference to some drawings. Note that because the present embodiment has the same basic configuration as the first embodiment, the following describes only characteristic configurations. The present embodiment, like the fourth embodiment, employs a configuration such that the print data generation software 220 gives a notification without the print preview software 230 being activated. Further, the present embodiment employs a configuration such that a notification is given of the spot-color specified color of the spot color region located in the vicinity of the spot color's approximate color region, and a link button is displayed to guide to a webpage related to a method and notes for specifying a spot color.

Figure 21:
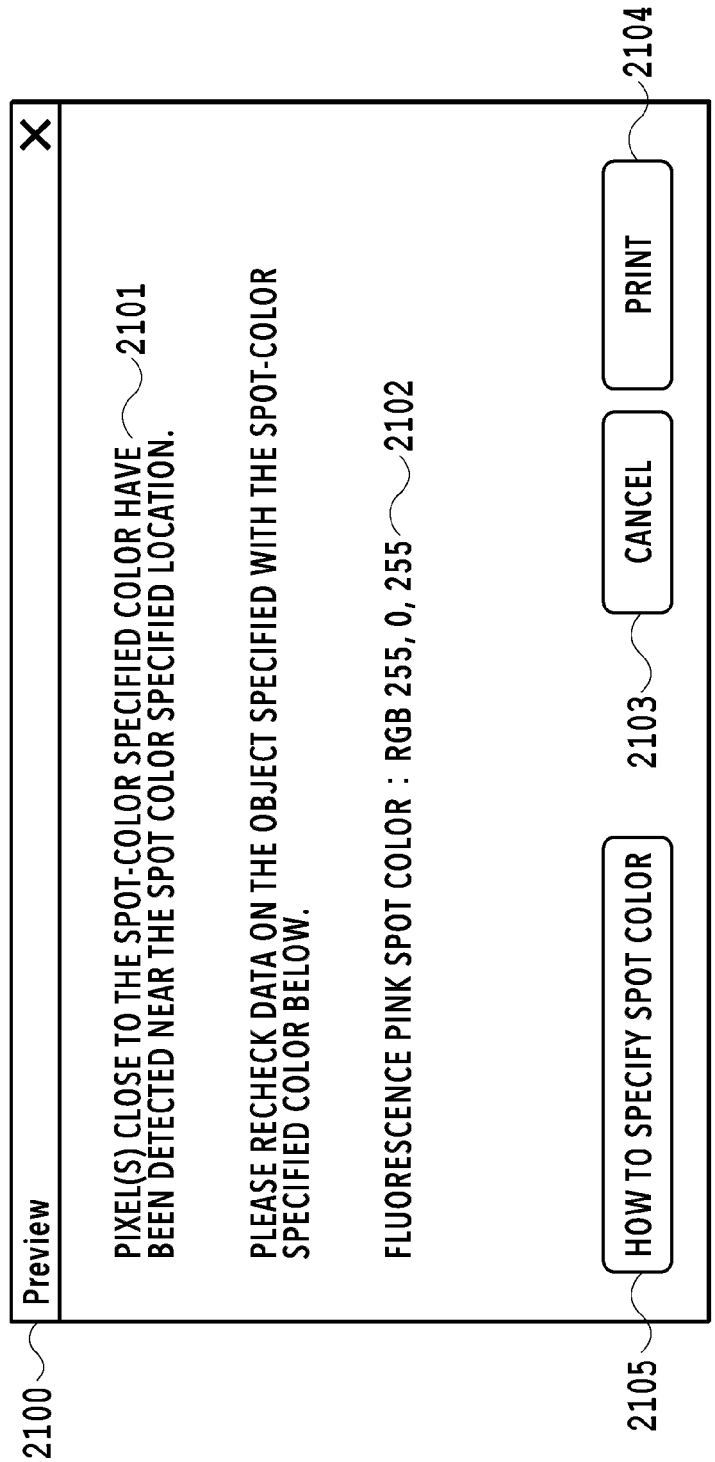
FIG. 21 is a diagram showing an example of a message dialogue.

FIG. 21 is a diagram showing an example of a message dialogue displayed in S1905 in FIG. 19 in the present embodiment. A message 2101 is a message for notifying that there is a spot color's approximate color, and a spot-color specified color 2102 shows the spot-color specified color of the spot color region based on which the spot color's approximate color region has been detected. Also, a cancel button 2103 is the same as the cancel button 2002 in FIG. 20, and a print button 2104 is the same as the print button 2003 in FIG. 20. A link button 2105 is a link button to a webpage describing a guide on how to specify a spot color, and a predetermined website is opened by a default web browser in response to the button being pressed.

In this way, even in a case where no preview screen is displayed, a user can know prior to printing that there is a spot color's approximate color and that an object for which a spot color is specified has a pixel therearound that can cause an unexpected printing result. Also, because a user can be led from the notification dialogue to a page having a guide on how to specify a spot color, spot color printing can be performed more easily and as intended.

(Other Applications)

The following describes other applications of the present disclosure. Note that because the present embodiment has the same basic configuration as the first embodiment, the following describes only characteristic configurations.

By stretching the first to fifth embodiments described above, the present invention can also be applied to configurations other than one that uses a spot color such as a fluorescence ink. For example, some inkjet printers perform printing using two black color materials: a dye ink with high permeability and a pigment ink with low permeability. In such an ink jet printer that uses both a pigment black ink and a dye black ink on a single print medium, a decrease in image quality called bleeding may occur at a border between their respective ink droplets. Due to, e.g., anti-aliasing and compression noise included in print data described above, ink droplets of the above two types may be disposed next to each other. Through application of the above embodiments, this may be detected in advance, and a user can be notified so that an unintended print result can be avoided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can also be implemented by the following processing. Specifically, programs for implementing one or more functions of the embodiments described above are supplied to a system or apparatus via a network or a storage medium, and one or more processors in a computer in the system or apparatus read and execute the programs. The present invention can also be implemented by a circuit (e.g., an ASIC) that implements the one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-087746 filed May 30, 2022, which is hereby incorporated by reference wherein in its entirety.

What is claimed is:

1. A control method for an information processing apparatus, the control method comprising:
   identifying a special color region in an image to be printed, the special color region being a region including a pixel having a pixel value corresponding to that of a region to be printed using at least a special color ink, wherein a color of the special color ink is other than a process color;
   detecting an approximate color region from surrounding pixels of the special color region identified in the identifying, the approximate color region being a region including a pixel with a pixel value which is different from the pixel value of the pixel of the special color region by a predetermined threshold or below and which corresponds to that of a region not to be printed using the special color ink; and
   displaying a predetermined presentation based on that the approximate color region has been detected in the detecting and not displaying the predetermined presentation in a case where the approximate color region is not detected in the detecting.

2. The control method according to claim 1, wherein the predetermined presentation is displayed in a case where a number of pixels included in the approximate color region detected in the detecting is a predetermined detection pixel count or above.

3. The control method according to claim 1, wherein the identifying and the detecting are part of processing to scan a pixel in the image to be printed, and
   in the detecting, a difference between the pixel value of the pixel of the special color region and a pixel value of the scanned pixel is calculated, and in a case where the calculated difference equals or falls below the predetermined threshold, it is determined that the scanned pixel is the approximate color region.

4. The control method according to claim 3, further comprising displaying the approximate color region detected in the detecting.

5. The control method according to claim 3, further comprising setting the predetermined threshold.

6. The control method according to claim 4, comprising excluding, from the approximate color region detected in the detecting, a pixel with a color difference in a predetermined range.

7. The control method according to claim 6, further comprising setting the predetermined range.

8. The control method according to claim 3, further comprising obtaining attribute information related to an attribute of the image to be printed, wherein
it is determined that the scanned pixel is the approximate color region in a case where the attribute information on the scanned pixel is information indicating an image attribute, not a text attribute, and in a case where the calculated difference equals or falls below the predetermined threshold.

9. The control method according to claim 1, further comprising replacing the approximate color region detected in the detecting with the pixel value corresponding to the region to be printed using at least the special color ink.

10. The control method according to claim 9, wherein
the predetermined presentation is a presentation for asking a user whether to replace the approximate color region with the pixel value corresponding to the region to be printed using at least the special color ink.

11. The control method according to claim 1, wherein
the predetermined presentation is processing to display a link button linked to a guide on a printing method of performing printing using the special color ink.

12. The control method according to claim 1, wherein
the predetermined presentation is processing to notify of a color of the special color ink corresponding to the pixel of the special color region in a vicinity of the approximate color region detected in the detecting.

13. The control method according to claim 1, wherein
the special color ink is a fluorescence ink.

14. The control method according to claim 1, wherein
the special color ink is any one of a violet ink, a green ink, an orange ink, a gold ink, and a silver ink.

15. The control method according to claim 1, wherein
the region to be printed using at least the special ink includes a region to be printed using both of the special color ink and an ink of the process color.

16. The control method according to claim 1, wherein
the region not to be printed by the special color ink is a region to be printed using an ink of the process color, not using the special color ink.

17. The control method according to claim 1, further comprising
transmitting predetermined print data to an image forming apparatus, the predetermined print data is used for printing by using the at least the special color ink.

18. An information processing apparatus comprising:
at least one processor; and
at least one memory storing instructions that, when executed by the at least one processor, cause the information processing apparatus to:
identify a special color region in an image to be printed, the special color region being a region including a pixel having a pixel value corresponding to that of a region to be printed using at least a special color ink, wherein a color of the special color ink is other than a process color;
detect an approximate color region from surrounding pixels of the identified special color region, the approximate color region being a region including a pixel with a pixel value which is different from the pixel value of the pixel of the special color region by a predetermined threshold or below and which corresponds to that of a region not to be printed using the special color ink; and
display a predetermined presentation based on that the approximate color region has been detected and not display the predetermined presentation in a case where the approximate color region is not detected.

19. A non-transitory computer-readable storage medium recording a program for causing a computer in an information processing apparatus to implement:
identifying a special color region in an image to be printed, the special color region being a region including a pixel having a pixel value corresponding to that of a region to be printed using at least a special color ink, wherein a color of the special color ink is other than a process color;
detecting an approximate color region from surrounding pixels of the region identified in the identifying, the approximate color region being a region including a pixel with a pixel value which is different from the pixel value of the pixel of the special color region by a predetermined threshold or below and which corresponds to that of a region not to be printed using the special color ink; and
displaying a predetermined presentation based on that the approximate color region has been detected in the detecting and not displaying the predetermined presentation in a case where the approximate color region is not detected in the detecting.

* * * * *